United States Patent
Matsukawa et al.

(10) Patent No.: US 11,214,522 B2
(45) Date of Patent: Jan. 4, 2022

(54) POLYCRYSTALLINE CUBIC BORON NITRIDE AND METHOD FOR MANUFACTURING THE SAME

(71) Applicant: SUMITOMO ELECTRIC HARDMETAL CORP., Itami (JP)

(72) Inventors: Michiko Matsukawa, Itami (JP); Satoru Kukino, Itami (JP); Taisuke Higashi, Itami (JP); Machiko Abe, Itami (JP)

(73) Assignee: SUMITOMO ELECTRIC HARDMETAL CORP., Itami (JP)

( * ) Notice: Subject to any disclaimer, the term of this patent is extended or adjusted under 35 U.S.C. 154(b) by 0 days.

(21) Appl. No.: 17/052,855

(22) PCT Filed: Feb. 27, 2020

(86) PCT No.: PCT/JP2020/008151
§ 371 (c)(1),
(2) Date: Nov. 4, 2020

(87) PCT Pub. No.: WO2020/175644
PCT Pub. Date: Sep. 3, 2020

(65) Prior Publication Data
US 2021/0238100 A1    Aug. 5, 2021

(30) Foreign Application Priority Data

Feb. 28, 2019  (JP) .............................. JP2019-036262
Jan. 17, 2020  (WO) .................. PCT/JP2020/001437

(51) Int. Cl.
*C04B 35/5831*    (2006.01)
*B23B 27/18*       (2006.01)

(52) U.S. Cl.
CPC .......... *C04B 35/5831* (2013.01); *B23B 27/18* (2013.01); *B23B 2226/125* (2013.01);
(Continued)

(58) Field of Classification Search
CPC .......... C04B 35/5831; C04B 2235/767; C04B 2235/77; C04B 2235/762; C04B 2235/549; B23B 2226/125
See application file for complete search history.

(56) References Cited

U.S. PATENT DOCUMENTS

| 4,188,194 A | 2/1980 | Corrigan |
| 4,289,503 A | 9/1981 | Corrigan |

(Continued)

FOREIGN PATENT DOCUMENTS

| JP | S54-33510 A | 3/1979 |
| JP | S61-17406 A | 1/1986 |

(Continued)

*Primary Examiner* — Noah S Wiese
(74) *Attorney, Agent, or Firm* — Faegre Drinker Biddle & Reath LLP

(57) ABSTRACT

A polycrystalline cubic boron nitride comprising 96% by volume or more of cubic boron nitride, wherein the cubic boron nitride has a dislocation density of more than $8 \times 10^{15}$/$m^2$, the polycrystalline cubic boron nitride comprises a plurality of crystal grains, and the plurality of crystal grains have a median diameter d50 of an equivalent circle diameter of less than 100 nm.

16 Claims, 3 Drawing Sheets

(52) U.S. Cl.
CPC .. *C04B 2235/549* (2013.01); *C04B 2235/762* (2013.01); *C04B 2235/767* (2013.01); *C04B 2235/77* (2013.01)

(56) References Cited

U.S. PATENT DOCUMENTS

| | | | |
|---|---|---|---|
| 6,315,838 B1 * | 11/2001 | Dunand | C21D 1/00 148/514 |
| 2009/0169840 A1 | 7/2009 | Okamura et al. | |
| 2018/0029942 A1 * | 2/2018 | Ishida | C04B 35/583 |

FOREIGN PATENT DOCUMENTS

| | | |
|---|---|---|
| JP | H01-208371 A | 8/1989 |
| JP | H11-246271 A | 9/1999 |
| JP | 2003-192443 A | 7/2003 |
| JP | 2006-201216 A | 8/2006 |
| JP | 2011-98875 A | 5/2011 |
| WO | WO-2007/145071 A1 | 12/2007 |

\* cited by examiner

POLYCRYSTALLINE CUBIC BORON NITRIDE AND METHOD FOR MANUFACTURING THE SAME

The present disclosure relates to a polycrystalline cubic boron nitride and a method for manufacturing the same. This application claims priority from Japanese Patent Application No. 2019-036262 filed on Feb. 28, 2019, and International Application PCT/JP2020/001437 filed on Jan. 17, 2020. The entire contents of the Japanese patent application and the international application are incorporated herein by reference.

TECHNICAL FIELD

Background Art

Cubic boron nitride (hereinafter, also referred to as "cBN") has a hardness that is second only to diamond, and also has excellent thermal stability and chemical stability. For this reason, cubic boron nitride sintered bodies have been used as a material for tools.

As the cubic boron nitride sintered body, a sintered body including about 10 to 40% by volume of a binder has been used. However, the binder causes the strength and thermal diffusivity of the sintered body to decrease.

To solve this problem, there has been developed a method in which sintering is conducted while simultaneously directly converting a hexagonal boron nitride into cubic boron nitride at ultrahigh pressure and high temperature without using a binder to obtain a binder-free cubic boron nitride sintered body.

Japanese Patent Laying-Open No. 11-246271 (Patent Literature 1) discloses a technique for obtaining a cubic boron nitride sintered body by directly converting and sintering a low-crystallinity hexagonal boron nitride into a cubic boron nitride sintered body under ultrahigh temperature and high pressure.

CITATION LIST

Patent Literature

PTL 1: Japanese Patent Laying-Open No. 11-246271

SUMMARY OF INVENTION

A polycrystalline cubic boron nitride of the present disclosure is a polycrystalline cubic boron nitride comprising 96% by volume or more of cubic boron nitride, wherein the cubic boron nitride has a dislocation density of more than $8 \times 10^{15}/m^2$,
the polycrystalline cubic boron nitride comprises a plurality of crystal grains, and
the plurality of crystal grains have a median diameter d50 of an equivalent circle diameter of less than 100 nm.

A method for manufacturing a polycrystalline cubic boron nitride of the present disclosure is a method for manufacturing the above-described polycrystalline cubic boron nitride, comprising:
a first step of preparing a hexagonal boron nitride powder having a d90 of an equivalent circle diameter of 0.3 μm or less; and
a second step of heating and pressurizing the hexagonal boron nitride powder to a temperature greater than or equal to 1500° C. and less than or equal to 2200° C. and to a pressure greater than or equal to 10 GPa, with the temperature and the pressure passing through a temperature and a pressure in a stable region of a wurtzite boron nitride, to obtain the polycrystalline cubic boron nitride, wherein
the stable region of wurtzite boron nitride is, when the temperature is represented as T° C. and the pressure as P GPa, a region that simultaneously satisfies the following Formula 1 and Formula 2, $$P \geq -0.0037T + 11.301 \quad \text{Formula 1:}$$

$$P \leq -0.085T + 117 \quad \text{Formula 2:}$$

in a heating and pressurizing path of the second step, an entry temperature into the stable region of wurtzite boron nitride is 500° C. or less, and
the second step comprises a step of holding the temperature and the pressure in the heating and pressurizing path for 10 minutes or more at a temperature and a pressure in the stable region of wurtzite boron nitride.

A method for manufacturing a polycrystalline cubic boron nitride of the present disclosure is a method for manufacturing the above-described polycrystalline cubic boron nitride, comprising:
a step A of preparing pyrolytic boron nitride; and
a step B of heating and pressurizing the pyrolytic boron nitride to a temperature and a pressure in a final sintering region, with the temperature and the pressure passing through a temperature and a pressure in a stable region of a wurtzite boron nitride, to obtain the polycrystalline cubic boron nitride, wherein
the stable region of wurtzite boron nitride is, when the temperature is represented as T° C. and the pressure as P GPa, a region that simultaneously satisfies the following Formula 1 and Formula 2, $$P \geq -0.0037T + 11.301 \quad \text{Formula 1:}$$

$$P \leq -0.085T + 117 \quad \text{Formula 2:}$$

the final sintering region is, when the temperature is represented as T° C. and the pressure as P GPa, a region that simultaneously satisfies the following Formula 4, Formula 5, and Formula 6, $$P \geq 12 \quad \text{Formula 4:}$$

$$P \geq -0.085T + 125.5 \quad \text{Formula 5:}$$

$$P \leq -0.085T + 151 \quad \text{Formula 6:}$$

and in the heating and pressurizing path of step B, an entry temperature into the stable region of wurtzite boron nitride is 500° C. or less.

DESCRIPTION OF EMBODIMENTS

Figure 1:
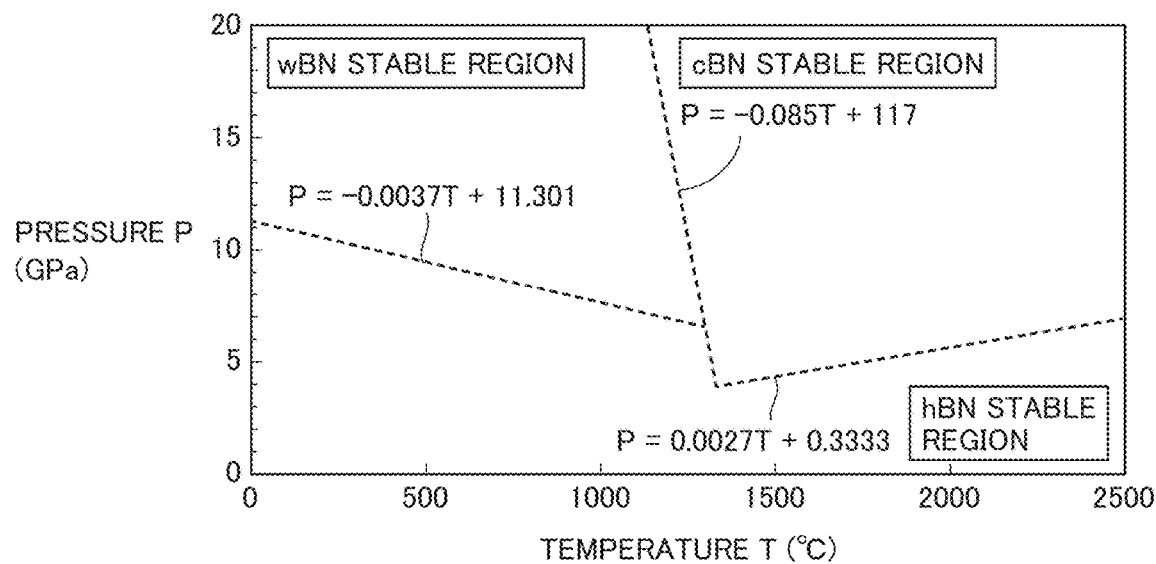
FIG. 1 is a pressure-temperature phase diagram of boron nitride.

Problem to be Solved by Present Disclosure

In recent years, particularly in the field of dies, precision machining is increasing. When a polycrystalline cubic boron nitride is used in precision machining, the blade edge becomes worn, whereby the tool life tends to shorten. Therefore, there is a need for a tool capable of exhibiting an excellent tool life even in precision machining.

Accordingly, an object of the present invention is to provide a polycrystalline cubic boron nitride that can have a long tool life when used as a tool, particularly when used in precision machining.

Advantageous Effects of Present Disclosure

According to the present disclosure, the polycrystalline cubic boron nitride can have a long tool life when used as a tool, particularly when used in precision machining.

DESCRIPTION OF EMBODIMENTS OF PRESENT DISCLOSURE

First, the embodiments of the present disclosure will be listed and described.

(1) A polycrystalline cubic boron nitride of the present disclosure is a polycrystalline cubic boron nitride comprising 96% by volume or more of cubic boron nitride, wherein the cubic boron nitride has a dislocation density of more than $8 \times 10^{15}/m^2$, the polycrystalline cubic boron nitride comprises a plurality of crystal grains, and the plurality of crystal grains have a median diameter d50 of an equivalent circle diameter of less than 100 nm.

According to the present disclosure, the polycrystalline cubic boron nitride can have a long tool life when used as a tool, particularly when used in precision machining.

(2) The dislocation density is preferably $9 \times 10^{15}/m^2$ or more. By having such a dislocation density, the tool has better wear resistance.

(3) The polycrystalline cubic boron nitride preferably comprises 0.01% by volume or more of hexagonal boron nitride. A tool using this polycrystalline cubic boron nitride can have a better tool life.

(4) The polycrystalline cubic boron nitride preferably comprises 0.01% by volume or more of compressed hexagonal boron nitride. A tool using the polycrystalline cubic boron nitride can have a better tool life.

(5) The polycrystalline cubic boron nitride preferably includes 0.1% by volume or more of wurtzite boron nitride. A tool using this polycrystalline cubic boron nitride can have a better tool life.

(6) The polycrystalline cubic boron nitride preferably comprises a total content of an alkali metal element and an alkaline earth metal element of 10 ppm or less in terms of mass. A tool using such a polycrystalline cubic boron nitride can have a better tool life.

(7) It is preferable that the dislocation density be calculated by using a modified Williamson-Hall method and a modified Warren-Averbach method. The dislocation density serves as a good correlation for the performance of the polycrystalline cubic boron nitride.

(8) It is preferable that the dislocation density be measured using synchrotron radiation as an X-ray source. The dislocation density serves as a good correlation for the performance of the polycrystalline cubic boron nitride.

(9) A method for manufacturing a polycrystalline cubic boron nitride of the present disclosure is a method for manufacturing the above-described polycrystalline cubic boron nitride, comprising:

a first step of preparing a hexagonal boron nitride powder having a d90 of an equivalent circle diameter of 0.3 μm or less; and a second step of heating and pressurizing the hexagonal boron nitride powder to a temperature greater than or equal to 1500° C. and less than or equal to 2200° C. and to a pressure greater than or equal to 10 GPa, with the temperature and the pressure passing through a temperature and a pressure in a stable region of a wurtzite boron nitride, to obtain the polycrystalline cubic boron nitride, wherein the stable region of wurtzite boron nitride is, when the temperature is represented as T° C. and the pressure as P GPa, a region that simultaneously satisfies the following Formula 1 and Formula 2, $$P \geq -0.0037T + 11.301 \quad \text{Formula 1:}$$

$$P \leq -0.085T + 117 \quad \text{Formula 2:}$$

in a heating and pressurizing path of the second step, an entry temperature into the stable region of wurtzite boron nitride is 500° C. or less, and the second step comprises a step of holding the temperature and the pressure in the heating and pressurizing path for 10 minutes or more at a temperature and a pressure in the stable region of wurtzite boron nitride.

The polycrystalline cubic boron nitride obtained by this production method can have a long tool life when used as a tool, particularly when used in precision machining.

(10) The entry temperature is preferably 300° C. or less. By setting to such an entry temperature, a tool using the obtained polycrystalline cubic boron nitride has an even better tool life.

(11) It is preferable that the second step comprises a step of holding the temperature and the pressure in the heating and pressurizing path for 15 minutes or more at a temperature and a pressure in the stable region of wurtzite boron nitride. According to this, a tool using the obtained polycrystalline cubic boron nitride has an even better tool life.

(12) It is preferable that the second step comprises a step of, when the temperature is represented as T° C. and the pressure as P GPa, holding the temperature and the pressure in the heating and pressurizing path for 10 minutes or more at a temperature and a pressure in a region that simultaneously satisfies the following Formula 1, Formula 2, and Formula 3.

$$P \geq -0.0037T + 11.301 \quad \text{Formula 1:}$$

$$P \leq -0.085T + 117 \quad \text{Formula 2:}$$

$$P \leq -0.0037T + 11.375 \quad \text{Formula 3:}$$

According to this, a tool using the obtained polycrystalline cubic boron nitride has an even better tool life.

(13) It is preferable to comprise a third step of, after the second step, holding the polycrystalline cubic boron nitride obtained in the second step for 10 minutes or more and 30 minutes or less under conditions of a temperature of 1500° C. or more and 2200° C. or less and a pressure of 10 GPa or more. By including this step, a tool using the obtained polycrystalline cubic boron nitride has an even better tool life.

(14) A method for manufacturing the polycrystalline cubic boron nitride of the present disclosure is a method for manufacturing the above-described polycrystalline cubic boron nitride, comprising:

a step A of preparing pyrolytic boron nitride; and a step B of heating and pressurizing the pyrolytic boron nitride to a temperature and a pressure in a final sintering region, with the temperature and the pressure passing through a temperature and a pressure in a stable region of a wurtzite boron nitride, to obtain the polycrystalline cubic boron nitride, wherein the stable region of wurtzite boron nitride is, when the temperature is represented as T° C. and the pressure as P GPa, a region that simultaneously satisfies the following Formula 1 and Formula 2, $$P \geq -0.0037T + 11.301 \quad \text{Formula 1:}$$

$$P \leq -0.085T + 117 \quad \text{Formula 2:}$$

the final sintering region is, when the temperature is represented as T° C. and the pressure as P GPa, a region that simultaneously satisfies the following Formula 4, Formula 5, and Formula 6, $$P \geq 12 \quad \text{Formula 4:}$$

$$P \geq -0.085T + 125.5 \quad \text{Formula 5:}$$

$$P \leq -0.085T + 151 \quad \text{Formula 6:}$$

and in the heating and pressurizing path of step B, an entry temperature into the stable region of wurtzite boron nitride is 500° C. or less.

The polycrystalline cubic boron nitride obtained by this production method can have a long tool life when used as a tool, particularly when used in precision machining.

(15) The entry temperature is preferably 300° C. or less. By setting to such an entry temperature, a tool using the obtained polycrystalline cubic boron nitride has an even better tool life.

(16) It is preferable to comprise a step C of, after step B, holding the polycrystalline cubic boron nitride obtained in step B for 10 minutes or more and 30 minutes or less under conditions of a temperature and a pressure in the final sintering region. By including this step, a tool using the obtained polycrystalline cubic boron nitride has an even better tool life.

DETAILS OF EMBODIMENTS OF PRESENT DISCLOSURE

The polycrystalline cubic boron nitride of the present disclosure and a production method thereof will now be described with reference to the drawings.

First Embodiment: Polycrystalline Cubic Boron Nitride

A polycrystalline cubic boron nitride according to an embodiment of the present disclosure will now be described.
<Polycrystalline Cubic Boron Nitride>

The polycrystalline cubic boron nitride of the present disclosure is a polycrystalline cubic boron nitride including 96% by volume or more of cubic boron nitride, wherein the polycrystalline cubic boron nitride has a dislocation density of more than $8 \times 10^{15}/m^2$, the polycrystalline cubic boron nitride includes a plurality of crystal grains, and the plurality of crystal grains have a median diameter d50 of an equivalent circle diameter of less than 100 nm.

The polycrystalline cubic boron nitride of the present disclosure is a sintered body, but since it is often intended that a sintered body include a binder, the term "polycrystalline body" is used in the present disclosure.

When used as a tool, the polycrystalline cubic boron nitride of the present disclosure can have a long tool life, particularly in precision machining. Although the reason for this is not clear, it is presumed to be as described in the following (i) to (iii).

(i) The polycrystalline cubic boron nitride of the present disclosure includes 96% by volume or more of cubic boron nitride, and has a very low content of components such as a binder, a sintering aid, and catalyst. Therefore, the cubic boron nitride grains are firmly bonded to each other, so that the strength and thermal diffusivity of the polycrystalline cubic boron nitride are improved. Therefore, a tool using the polycrystalline cubic boron nitride can have a long tool life even in precision machining.

(ii) In polycrystalline cubic boron nitride of the present disclosure, the dislocation density of the cubic boron nitride is more than $8 \times 10^{15}/m^2$. Since the polycrystalline cubic boron nitride has a relatively large number of lattice defects in the polycrystalline body and a large strain, wear resistance is improved. Therefore, a tool using the polycrystalline cubic boron nitride can have a long tool life even in precision machining.

(iii) In the polycrystalline cubic boron nitride of the present disclosure, the median diameter d50 (hereinafter, also referred to as "grain size") of an equivalent circle diameter of a plurality of crystal grains included therein is less than 100 nm. The polycrystalline cubic boron nitride has a higher strength as the grain size of the crystal grains is smaller. Therefore, the polycrystalline cubic boron nitride has a high strength, and a tool using the polycrystalline cubic boron nitride can have a long tool life even in precision machining.

In the above description, the polycrystalline cubic boron nitride of the present disclosure is described as having a long tool life in precision machining, but the machining method is not limited to this. Examples of the machining method include milling, turning, and the like. Further, examples of the work material include stainless tool steel and the like.

<Composition>

The polycrystalline cubic boron nitride of the present disclosure includes 96% by volume or more of cubic boron nitride. As a result, the polycrystalline cubic boron nitride has improved strength and thermal diffusivity, and excellent hardness, thermal stability, and chemical stability.

The polycrystalline cubic boron nitride can include, within a range in which the effects of the present disclosure are exhibited, in addition to cubic boron nitride, one, two, or all of hexagonal boron nitride, compressed hexagonal boron nitride, and wurtzite boron nitride. In this case, the total content of the hexagonal boron nitride, compressed hexagonal boron nitride, and wurtzite boron nitride in the polycrystalline cubic boron nitride can be 4% by volume or less. Here, the term "compressed hexagonal boron nitride" refers to a substance having a crystal structure similar to that of ordinary hexagonal boron nitride, in which the interplanar spacing in the c-axis direction is smaller than that of ordinary hexagonal boron nitride (0.333 nm).

The polycrystalline cubic boron nitride may include unavoidable impurities within a range in which the effects of the present disclosure are exhibited. Examples of unavoidable impurities include hydrogen, oxygen, carbon, alkali metal elements (in the present specification, the alkali metal elements include lithium (Li), sodium (Na), potassium (K)) and alkaline earth metal elements (in the present specification, the alkaline earth metal elements include calcium (Ca), magnesium (Mg), strontium (Sr), and barium (Ba)), silicon (Si), and aluminum (Al). When the polycrystalline cubic boron nitride includes unavoidable impurities, the content of the unavoidable impurities is preferably 0.1% by mass or less. The content of the unavoidable impurities can be measured by secondary ion mass spectrometry (SIMS).

The total content of alkali metal elements (lithium (Li), sodium (Na), potassium (K)) and alkaline earth metal elements (calcium (Ca), magnesium (Mg), strontium (Sr), and barium (Ba)) in the polycrystalline cubic boron nitride is preferably not more than 10 ppm. Among the above-described unavoidable impurities, the alkali metal elements and alkaline earth metal elements have a catalytic action on the phase conversion between hexagonal boron nitride and cubic boron nitride. When the total content of alkali metal elements and alkaline earth metal elements in the polycrystalline cubic boron nitride is 10 ppm or less, for a tool using the polycrystalline cubic boron nitride, even when the interface between the blade edge and the work material under the cutting environment is exposed to high temperature and high pressure, it is possible to better suppress the progress of damage to the tool due to conversion of a part of the cubic boron nitride constituting the tool into hexagonal boron nitride. The lower limit of the total content of alkali metal elements and the alkaline earth metal elements in the hexagonal boron nitride polycrystalline body is preferably 0 ppm. That is, the total content of alkali metal elements and alkaline earth metal elements in the hexagonal boron nitride polycrystalline body is preferably 0 ppm or more and 10 ppm or less.

A conventional cubic boron nitride sintered body is prepared by using, for example, as described in, Japanese Patent Laying-Open No. 2006-201216, cBN abrasive grains as a starting material. Here, the total content of the catalyst component (alkali metal elements and alkaline earth metal elements) remaining in the cBN abrasive grains (content of catalyst component in 1 mol of cBN) is $2.4 \times 10^{-4}$ to $13.5 \times 10^{-4}$ mol. Therefore, to a skilled person in the art, it is obvious that the total content of the catalyst component of a conventional polycrystalline cubic boron nitride obtained by sintering such cBN abrasive grains is 0.01% by mass (100 ppm) or more.

On the other hand, as described later, for the polycrystalline cubic boron nitride of the present disclosure, hexagonal boron nitride or pyrolytic boron nitride is used as the starting material, and the hexagonal boron nitride or pyrolytic boron nitride is converted into cubic boron nitride by heating and pressurizing, without using a catalyst. Therefore, the content of the catalyst component in the polycrystalline cubic boron nitride can be 10 ppm or less in terms of mass.

The total content of silicon (Si) and aluminum (Al) in the polycrystalline cubic boron nitride is preferably 50 ppm or less in terms of mass. By setting in this range, for a tool using the polycrystalline cubic boron nitride, even when the interface between the blade edge and the work material under the cutting environment is exposed to high temperature and high pressure, it is possible to better suppress the progress of damage to the tool due to a part of the cubic boron nitride constituting the tool reacting with Si or Al.

The polycrystalline cubic boron nitride preferably does not substantially include a binder, a sintering aid, a catalyst or the like. As a result, the polycrystalline cubic boron nitride has improved strength and thermal diffusivity.

The cubic boron nitride content in the polycrystalline cubic boron nitride is preferably 96% by volume or more and 100% by volume or less, more preferably 97% by volume or more and 100% by volume or less, and further preferably 98% by volume or more and 100% by volume or less. The upper limit of the cubic boron nitride content can be 100% by volume or less, 99.99% by volume or less, 99.9% by volume or less, 99.89% by volume or less, or 99.88% by volume or less.

The total content of hexagonal boron nitride, compressed hexagonal boron nitride, and wurtzite boron nitride in the polycrystalline cubic boron nitride is preferably 0% by volume or more and 4% by volume or less, preferably 0% by volume or more and 3% by volume or less, preferably 0% by volume or more and 2% by volume or less, and preferably 0% by volume. That is, it is preferable that the polycrystalline cubic boron nitride does not include any of hexagonal boron nitride, compressed hexagonal boron nitride, and wurtzite boron nitride.

The hexagonal boron nitride content in the polycrystalline cubic boron nitride is preferably 0% by volume or more and 4% by volume or less, preferably 0% by volume or more and 3% by volume or less, preferably 0% by volume or more and 2% by volume or less, and preferably 0% by volume. That is, it is preferable that the polycrystalline cubic boron nitride does not include hexagonal boron nitride.

The compressed hexagonal boron nitride content in the polycrystalline cubic boron nitride is preferably 0% by volume or more and 4% by volume or less, preferably 0% by volume or more and 3% by volume or less, preferably 0% by volume or more and 2% by volume or less, and preferably 0% by volume. That is, it is preferable that the polycrystalline cubic boron nitride does not include compressed hexagonal boron nitride.

The wurtzite boron nitride content in the polycrystalline cubic boron nitride is preferably 0% by volume or more and 4% by volume or less, preferably 0% by volume or more and 3% by volume or less, preferably 0% by volume or more and 2% by volume or less, and preferably 0% by volume. That is, it is preferable that the polycrystalline cubic boron nitride does not include wurtzite boron nitride.

Hexagonal boron nitride, compressed hexagonal boron nitride, and wurtzite boron nitride have low frictional resistance, and can reduce agglutination of the work material during cutting and reduce the cutting resistance. Further, hexagonal boron nitride, compressed hexagonal boron nitride, and wurtzite boron nitride are softer than cubic boron nitride and have excellent crack propagation resistance. Therefore, depending on the machining application, it may be preferable that the polycrystalline cubic boron nitride include hexagonal boron nitride, compressed hexagonal boron nitride and wurtzite boron nitride.

In the above case, it is preferable that the polycrystalline cubic boron nitride include 0.01% by volume or more of hexagonal boron nitride. The polycrystalline cubic boron nitride preferably includes 0.01% by volume or more and 4% by volume or less of hexagonal boron nitride, preferably includes 0.01% by volume or more and 3% by volume or less of hexagonal boron nitride, and preferably includes 0.01% by volume or more and 2% by volume or less of hexagonal boron nitride. In this case, it is preferable that the polycrystalline cubic boron nitride include 99.99% by volume or less of cubic boron nitride.

In the above case, it is preferable that the polycrystalline cubic boron nitride include 0.01% by volume or more of compressed hexagonal boron nitride. The polycrystalline cubic boron nitride preferably includes 0.01% by volume or more and 4% by volume or less of compressed hexagonal boron nitride, preferably includes 0.01% by volume or more and 3% by volume or less of compressed hexagonal boron nitride, and preferably includes 0.01% by volume or more and 2% by volume or less of compressed hexagonal boron nitride. In this case, it is preferable that the polycrystalline cubic boron nitride include 99.99% by volume or less of cubic boron nitride.

In the above case, it is preferable that the polycrystalline cubic boron nitride include 0.1% by volume or more of wurtzite boron nitride. The polycrystalline cubic boron nitride preferably includes 0.1% by volume or more and 4% by volume or less of wurtzite boron nitride, preferably includes 0.1% by volume or more and 3% by volume or less of wurtzite boron nitride, and preferably includes 0.1% by volume or more and 2% by volume or less of wurtzite boron nitride. In this case, it is preferable that the polycrystalline cubic boron nitride include 99.9% by volume or less of cubic boron nitride.

The content (% by volume) of the cubic boron nitride, hexagonal boron nitride, compressed hexagonal boron nitride, and wurtzite boron nitride in the polycrystalline cubic boron nitride can be measured by an X-ray diffraction method. The specific measurement method is as follows.

The polycrystalline cubic boron nitride is cut with a diamond grindstone-electrodeposited wire, and the cut surface is used as an observation surface.

Using an X-ray diffractometer ("MiniFlex 600" (trade name) manufactured by Rigaku), the X-ray spectrum of a cut surface of the polycrystalline cubic boron nitride is obtained. The conditions of the X-ray diffractometer at this time are as follows.

Characteristic X-ray: Cu-Kα (wavelength 1.54 Å)
Tube voltage: 45 kV
Tube current: 40 mA
Filter: Multi-layer mirror
Optical system: Focused method
X-ray diffraction method: θ-2θ method In the obtained X-ray spectrum, the following peak intensity A, peak intensity B, peak intensity C, and peak intensity D are measured.

Peak intensity A: Peak intensity of compressed hexagonal boron nitride excluding the background from the peak intensity near the diffraction angle 2θ=28.5°.

Peak intensity B: Peak intensity of wurtzite boron nitride excluding the background from the peak intensity near the diffraction angle 2θ=40.8°.

Peak intensity C: Peak intensity of cubic boron nitride excluding the background from the peak intensity near the diffraction angle 2θ=43.5°.

Peak intensity D: Peak intensity of hexagonal boron nitride excluding the background from the peak intensity near the diffraction angle 2θ=26.8°.

The compressed hexagonal boron nitride content is obtained by calculating the value of peak intensity A/(peak intensity A+peak intensity B+peak intensity C+peak intensity D). The wurtzite boron nitride content is obtained by calculating the value of peak intensity B/(peak intensity A+peak intensity B+peak intensity C+peak intensity D). The cubic boron nitride content is obtained by calculating the value of peak intensity C/(peak intensity A+peak intensity B+peak intensity C+peak intensity D). The hexagonal boron nitride content is obtained by calculating the value of peak intensity D/(peak intensity A+peak intensity B+peak intensity C+peak intensity D).

Since compressed hexagonal boron nitride, wurtzite boron nitride, cubic boron nitride, and hexagonal boron nitride all have similar electron density, the above-described X-ray peak intensity ratio can be taken as the volume ratio in the polycrystalline cubic boron nitride.

<Dislocation Density>

In the polycrystalline cubic boron nitride of the present disclosure, the cubic boron nitride dislocation density is more than $8\times10^{15}/m^2$ Since the polycrystalline cubic boron nitride has a relatively large number of lattice defects in the polycrystalline body and a large strain, wear resistance is improved. Therefore, a tool using the polycrystalline cubic boron nitride can have a long tool life even in precision machining. The dislocation density is preferably $9\times10^{15}/m^2$ or more, and more preferably $1.0\times10^{16}/m^2$ or more. The upper limit of the dislocation density is not particularly limited, but from a production viewpoint, it may be $1.4\times10^{16}/m^2$. That is, the dislocation density is preferably more than $8\times10^{15}/m^2$ and $1.4\times10^{16}/m^2$ or less, more preferably $9\times10^{15}/m^2$ or more and $1.4\times10^{16}/m^2$ or less, and further preferably $1.0\times10^{16}/m^2$ or more and $1.4\times10^{16}/m^2$ or less.

In the present specification, the dislocation density is calculated by the following procedure. A test piece composed of the polycrystalline cubic boron nitride is provided. In terms of size, the test piece has an observation surface of 2.0 mm×2.0 mm and a thickness of 1.0 mm. The observation surface of the test piece is polished.

X-ray diffraction measurement is performed on the observation surface of the test piece under the following conditions, and a line profile of a diffraction peak from each orientation plane of cubic boron nitride's major orientations which are (111), (200), (220), (311), (400) and (331) is obtained.

(X-Ray Diffraction Measurement Conditions)
X-ray source: synchrotron radiation
Condition for equipment: detector NaI (fluorescence is cut by an appropriate ROI)
Energy: 18 keV (wavelength: 0.6888 Å)
Spectroscopic crystal: Si (111)
Entrance slit: width 5 mm×height 0.5 mm
Light receiving slit: double slit (width 3 mm×height 0.5 mm)
Mirror: platinum coated mirror
Incident angle: 2.5 mrad
Scanning method: 2θ-θ scan
Measurement peaks: six peaks from cubic boron nitride's (111), (200), (220), (311), (400), and (331). When it is difficult to obtain a profile depending on texture and orientation, the peak for that Miller index is excluded.

Measurement conditions: there are 9 or more measurement points set in the full width at half maximum. Peak top intensity is set to 2000 counts or more. Peak tail is also used in the analysis, and accordingly, the measurement range is set to about 10 times the full width at half maximum.

A line profile obtained from the above X-ray diffraction measurement will be a profile including both a true broadening attributed to a physical quantity such as the sample's inhomogeneous strain and a broadening attributed to the equipment. In order to determine inhomogeneous strain and crystallite size, a component attributed to the equipment is removed from the measured line profile to obtain a true line profile. The true line profile is obtained by fitting the obtained line profile and the line profile that is attributed to the equipment by a pseudo Voigt function, and subtracting the line profile attributed to the equipment. $LaB_6$ was used as a standard sample for removing a broadening of a diffracted peak attributed to the equipment. When significantly collimated radiation is used, a broadening of a diffracted peak attributed to the equipment may be regarded as zero.

The obtained true line profile is analyzed using the modified Williamson-Hall method and the modified Warren-Averbach method to calculate dislocation density. The modified Williamson-Hall method and the modified Warren-Averbach method are known line profile analysis methods used for determining dislocation density.

The modified Williamson-Hall method's expression is represented by the following expression (I):

[Expression 1]

[Expression 1]

$$\Delta K = \frac{0.9}{D} + \left(\frac{\pi M^2 b^2}{2}\right)^{1/2} \rho^{1/2} K C^{1/2} + O(K^2 C) \quad (1)$$

where $\Delta K$ represents a half width of a line profile, D represents a crystallite size, M represents a dislocation arrangement parameter, b represents a Burgers vector, $\rho$ represents dislocation density, K represents a scattering vector, $O(K^2C)$ represents a higher-order term of $K^2C$, and C represents an average contrast factor.

C in the above expression (I) is represented by the following expression (II):

$$C = C_{h00}[1 - q(h^2k^2 + h^2l^2 + k^2l^2)/(h^2 + k^2 + l^2)^2] \quad (II)$$

In the above expression (II), a contrast factor Choo for screw dislocation and that for edge dislocation and a coefficient q for each contrast factor are obtained by using the computing code ANIZC, with a slip system of <110>{111}, and elastic stiffness $C_{11}$, $C_{12}$ and $C_{44}$ of 8.44 GPa, 1.9 GPa, and 4.83 GPa, respectively. Contrast factor $C_{h00}$ is 0.203 for screw dislocation and 0.212 for edge dislocation. The coefficient q for the contrast factor is 1.65 for screw dislocation and 0.58 for edge dislocation. Note that screw dislocation's ratio is fixed to 0.5 and edge dislocation's ratio is fixed to 0.5.

Furthermore, between dislocation and inhomogeneous strain, a relationship represented by an expression (III) is established using contrast factor C, as below:

$$<\varepsilon(L)^2> = (\rho C b^2/4\pi)\ln(R_e/L) \quad (III)$$

where $R_e$ represents dislocation's effective radius.

By the relationship of the above expression (III) and the Warren-Averbach expression, the following expression (IV) can be presented, and as the modified Warren-Averbach method, dislocation density p and a crystallite size can be determined.

$$\ln A(L) = \ln A^S(L) - (\pi L^2 \rho b^2/2)\ln(R_e/L)(K^2C) + O(K^2C)^2 \quad (IV)$$

where A(L) represents a Fourier series, $A^S(L)$ represents a Fourier series for a crystallite size, and L represents a Fourier length.

For details of the modified Williamson-Hall method and the modified Warren-Averbach method, see T. Ungar and A. Borbely, "The effect of dislocation contrast on x-ray line broadening: A new approach to line profile analysis," Appl. Phys. Lett., vol. 69, no. 21, p. 3173, 1996, and T. Ungar, S. Ott, P. Sanders, A. Borbely, J. Weertman, "Dislocations, grain size and planar faults in nanostructured copper determined by high resolution X-ray diffraction and a new procedure of peak profile analysis," Acta Mater., vol. 46, no. 10, pp. 3693-3699, 1998.

<Crystal Grains>

(Median Diameter d50)

The plurality of crystal grains included in the polycrystalline cubic boron nitride of the present disclosure have a median diameter d50 of an equivalent circle diameter (hereinafter, also referred to as "median diameter d50") of less than 100 nm. The polycrystalline cubic boron nitride has a higher strength as the grain size of the crystal grains is smaller. Therefore, the polycrystalline cubic boron nitride has a high strength, and a tool using the polycrystalline cubic boron nitride can have a long tool life even in precision machining.

The lower limit of the median diameter d50 of the crystal grains is not particularly limited, but from a production viewpoint, can be set to, for example, 10 nm.

(Measurement Method of Median Diameter d50)

In the present specification, the median diameter d50 of an equivalent circle diameter of the plurality of crystal grains included in the polycrystalline cubic boron nitride refers to a value obtained by measuring each median diameter d50 of the plurality of crystal grains at each of five arbitrarily selected measurement locations, and calculating the average value thereof.

It is noted that according to the measurements conducted by the applicant, as long as the median diameter d50 is measured for the same sample, there was almost no variation in the measurement result even when the calculation was conducted a plurality of times by changing the selected locations in the measurement visual field of the polycrystalline cubic boron nitride, from which it was confirmed that the median diameter d50 is not arbitrary even by randomly setting the measurement visual field.

When the cubic boron nitride crystalline body is used as a part of a tool, a portion of the polycrystalline cubic boron nitride is cut with a diamond grindstone-electrodeposited wire or the like, the cut cross-section is polished, and five measurement locations are arbitrarily set on the polished surface.

A method for measuring the median diameter d50 of a circle-equivalent diameter of a plurality of crystal grains at each measurement location will now be specifically described.

The polycrystalline cubic boron nitride is cut with a diamond grindstone-electrodeposited wire or the like so that the measurement locations are exposed, and the cut surface is polished. The measurement locations on the polished surface are observed using a SEM ("JSM-7500F" (trade name) manufactured by JEOL Ltd.) to obtain SEM images. The size of the measurement visual field is 12 μm×15 and the observation magnification is 10,000 times.

For each of the five SEM images, in a state in which the grain boundaries of the crystal grains observed in the measurement visual field were isolated, the distribution of the equivalent circle diameter of each crystal grain was calculated using image processing software (Win Roof ver. 7.4.5).

The median diameter d50 is calculated with the entire measurement visual field as the denominator. The median diameter d50 is calculated from the distribution of the equivalent circle diameter of the crystal grains.

<Applications>

The polycrystalline cubic boron nitride of the present disclosure is suitable for use in a cutting tool, a wear resistant tool, a grinding tool, and the like.

A cutting tool, a wear resistant tool, and a grinding tool using the polycrystalline cubic boron nitride of the present disclosure may each be entirely composed of the polycrystalline cubic boron nitride, or only a part thereof (for example, in the case of a cutting tool, the blade edge portion) may be composed of the polycrystalline cubic boron nitride. Further, a coating film may be formed on the surface of each tool Examples of the cutting tool include a drill, an end mill, a blade edge exchangeable cutting tip for a drill, a blade edge exchangeable cutting tip for an end mill, a blade edge exchangeable cutting tip for milling, a blade edge exchangeable cutting tip for turning, a metal saw, a gear cutting tool, a reamer, a tap, a cutting bite, and the like.

Examples of the wear resistant tool include a die, a scriber, a scribing wheel, a dresser, and the like. Examples of the grinding tool include a grinding wheel.

Figure 4:
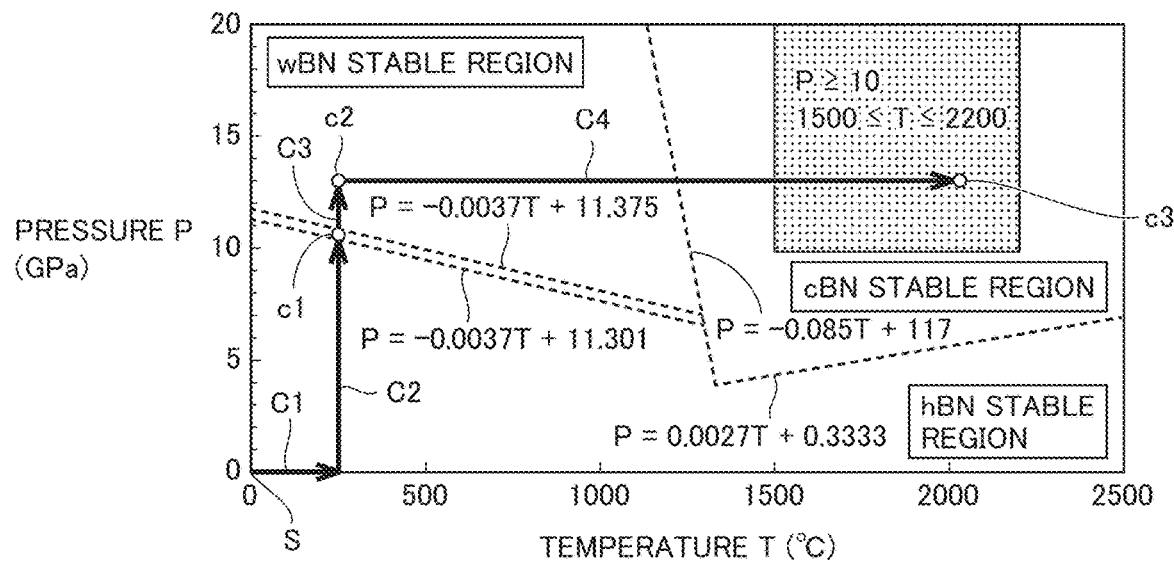
FIG. 4 is a diagram for showing another example of a method for manufacturing the polycrystalline cubic boron nitride of the present disclosure.
Figure 5:
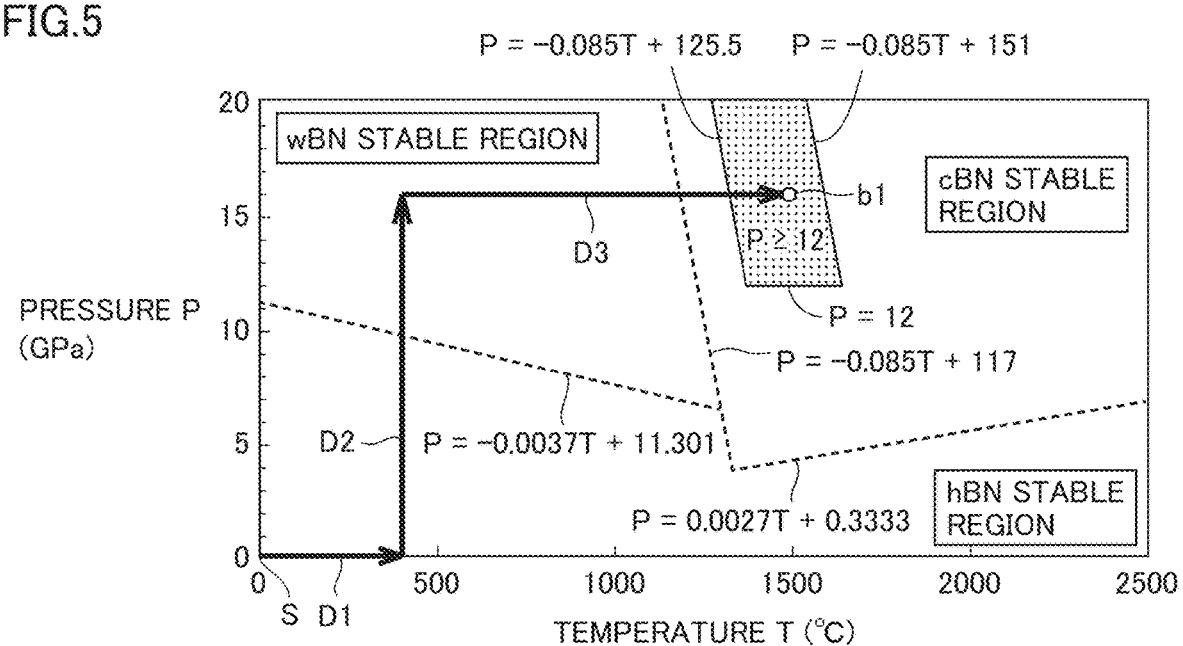
FIG. 5 is a diagram for showing another example of a method for manufacturing the polycrystalline cubic boron nitride of the present disclosure.
Figure 6:
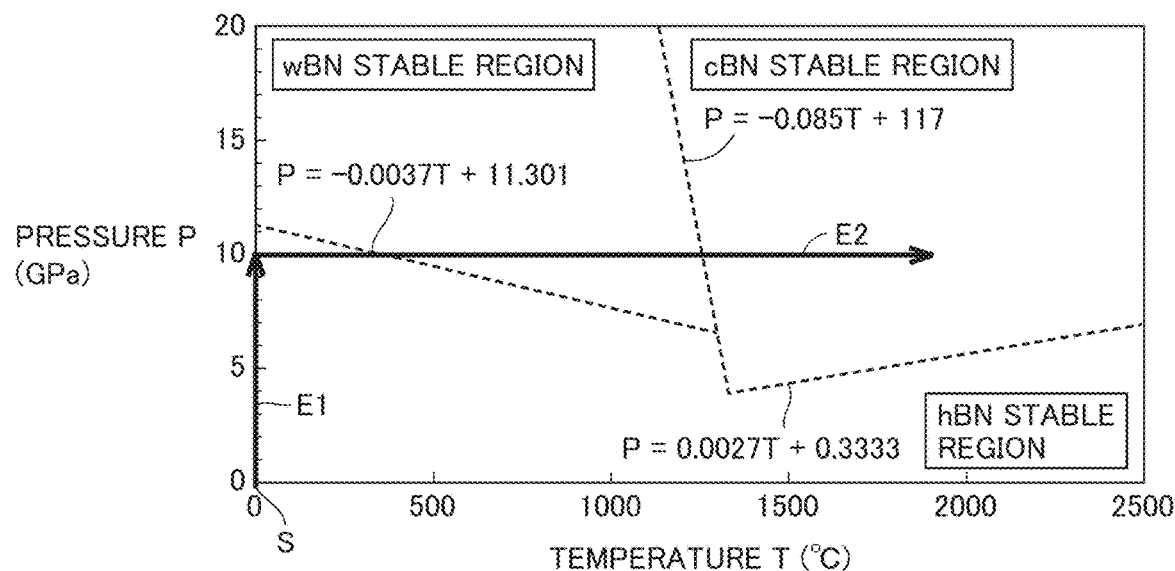
FIG. 6 is a diagram for showing a conventional example of a method for manufacturing a polycrystalline cubic boron nitride.

Second Embodiment: Method for Manufacturing Polycrystalline Cubic Boron Nitride A method for manufacturing the polycrystalline cubic boron nitride of the present disclosure will now be described with reference to FIGS. 1 to 6. FIG. 1 is a pressure-temperature phase diagram of boron nitride. FIGS. 2 to 5 are diagrams for showing methods for manufacturing the polycrystalline cubic boron nitride of the present disclosure. FIG. 6 is a diagram for showing a conventional example of a method for manufacturing a polycrystalline cubic boron nitride.

Before giving a detailed description of the method for manufacturing the polycrystalline cubic boron nitride of the present disclosure, in order to help understanding thereof, a pressure-temperature phase diagram of a polycrystalline cubic boron nitride, and a conventional example and a reference example of a method for manufacturing a polycrystalline cubic boron nitride will be described.

<Pressure-Temperature Phase Diagram>

As shown in FIG. 1, boron nitride includes three phases, namely, hexagonal boron nitride, which is a stable phase at ordinary temperature and ordinary pressure, cubic boron nitride, which is a stable phase at high temperature and high pressure, and wurtzite boron nitride, which is a metastable phase during the transition from hexagonal boron nitride to cubic boron nitride.

The boundary of each phase can be represented by a linear function. In the present specification, the temperature and pressure in the stable region of each phase can be shown using a linear function.

In the present specification, the temperature and pressure in the stable region of wurtzite boron nitride (in FIG. 1, indicated as "wBN stable region") are defined as, when the temperature is represented as T (° C.) and the pressure as P (GPa), a temperature and a pressure that simultaneously satisfy the following Formula 1 and Formula 2.

$P \geq -0.0037T+11.301$      Formula 1:

$P \leq -0.085T+117$      Formula 2:

In the present specification, the temperature and pressure in the stable region of hexagonal boron nitride (in FIG. 1, indicated as "hBN stable region") are defined as, when the temperature is represented as T° C. and the pressure as P (GPa), a temperature and a pressure that simultaneously satisfy the following Formula A and Formula B or a temperature and a pressure that simultaneously satisfy the following Formula C and Formula D.

$P \leq -0.0037T+11.301$      Formula A:

$P \leq -0.085T+117$      Formula B:

$P \leq -0.0027T+0.3333$      Formula C:

$P \geq -0.085T+117$      Formula D:

In the present specification, the temperature and pressure in the stable region of cubic boron nitride (in FIG. 1, indicated as "cBN stable region") are defined as, when the temperature is represented as T (° C.) and the pressure as P (GPa), a temperature and a pressure that simultaneously satisfy the following Formula D and Formula E.

$P \geq -0.085T+117$      Formula D:

$P \geq -0.0027T+0.3333$      Formula E:

Conventional Example of Production Method of Cubic Boron Nitride Composite Body Conventionally, the path shown in FIG. 6 (hereinafter, also referred to as "path of FIG. 6") was studied as the heating and pressurizing path for hexagonal boron nitride to attain a temperature and a pressure within the stable region of cubic boron nitride.

In the path of FIG. 6, when heating and pressurizing from the temperature and pressure at the starting point S (ordinary temperature and ordinary pressure) to the temperature and pressure in the stable region of cubic boron nitride (hereinafter, also referred to as "target temperature" and "target pressure", respectively), first, the pressure is increased to the target pressure (in FIG. 6, about 10 GPa) (arrow E1 in FIG. 6), and then the temperature is raised to the target temperature (in FIG. 6, about 1900° C.) (arrow E2 in FIG. 6). In the path of FIG. 6, heating and pressurization are each performed once, and therefore control of the heating and pressurizing operation is simple, and the path of FIG. 6 has been conventionally adopted.

In the path of FIG. 6, on the way to attaining a temperature and a pressure in the stable region of cubic boron nitride from the starting point S, the temperature and pressure pass through the stable region of wurtzite boron nitride. Conventionally, in order to shorten the cycle time of the production process, it was considered that a shorter time for attaining the stable region of cubic boron nitride from the starting point S is better. Further, the knowledge that in the heating and pressurizing step, the quality of the obtained polycrystalline cubic boron nitride improves by holding it at a temperature and a pressure in the stable region of wurtzite boron nitride for a certain period of time did not exist. Therefore, the heating and pressurizing conditions have been set so that the period of time taken passing through the stable region of wurtzite boron nitride is shorter.

However, for the polycrystalline cubic boron nitride obtained in the path of FIG. 6, damage tends to occur during machining, and the tool life tends to be shorter. Based on analytical evaluation of the polycrystalline cubic boron nitride obtained in the path of FIG. 6 carried out in order to discover the reasons for this, the present inventors surmised that the cubic boron nitride content in the polycrystalline cubic boron nitride has an influence on the tool life. Here, the cubic boron nitride content in the polycrystalline cubic boron nitride means, in the case that the polycrystalline cubic boron nitride includes cubic boron nitride together with hexagonal boron nitride and/or wurtzite boron nitride, the content of cubic boron nitride with the total content of cubic boron nitride, hexagonal boron nitride, and wurtzite boron nitride as the denominator.

Specifically, in the path of FIG. 6, it is surmised that since the holding time in the stable region of wurtzite boron nitride is short, the conversion rate from hexagonal boron nitride to wurtzite boron nitride decreases, and as a result, the conversion rate to cubic boron nitride also tends to decrease. Therefore, it was surmised that in the obtained polycrystalline cubic boron nitride, the cubic boron nitride content decreases, damage easily occurs during machining, and tool life tends to be shorter.

As a result of further studies by the present inventors, in the production steps of a polycrystalline cubic boron nitride, it was surmised that the entry temperature into the stable region of wurtzite boron nitride is related to the dislocation density of cubic boron nitride, and as a result, that the wear resistance of the obtained polycrystalline cubic boron nitride is affected.

The present inventors intensively studied the pressure and temperature paths in the production steps of a polycrystalline cubic boron nitride while considering the above-described situation and the influence on toughness of the grain size of the plurality of crystal grains included in the polycrystalline cubic boron nitride. As a result, the present inventors discovered heating and pressurizing conditions that are capable of obtaining a polycrystalline cubic boron nitride that can have a long tool life even in precision machining.

In the conventional method for manufacturing a cBN sintered body, a cBN powder is used as a starting material, the cBN powder is pressurized and then heated to perform sintering. It is inferred that the pressurization causes the grains of the cBN powder, which have a high hardness, to come into contact with each other, whereby dislocations are introduced into the cBN particles. However, as in the production method of the polycrystalline cubic boron nitride of the present disclosure, when a low hardness hBN powder or pyrolytic boron nitride is used as the starting material, and the heating and pressurizing treatment are carried out on such an hBN powder or pyrolytic boron nitride and converted into a polycrystalline cubic boron nitride, it is impossible to predict the dislocation density of the polycrystalline cubic boron nitride. As a result of intensive studies, the present inventors have newly discovered a relationship between the heating and pressurizing conditions and the dislocation density and tool performance of the polycrystalline cubic boron nitride.

The details of the method for manufacturing the polycrystalline cubic boron nitride of the present disclosure will now be described below.

<Method (1) for Manufacturing Polycrystalline Cubic Boron Nitride>

A method (1) for manufacturing the polycrystalline cubic boron nitride of the present disclosure is a method for manufacturing the polycrystalline cubic boron nitride of the first embodiment. The method (1) for manufacturing the polycrystalline cubic boron nitride of the present disclosure comprises a first step of preparing a hexagonal boron nitride powder having a d90 of an equivalent circle diameter of 0.3 μm or less (hereinafter, also referred to as "first step"), and a second step of heating and pressurizing the hexagonal boron nitride powder to a temperature greater than or equal to 1500° C. and less than or equal to 2200° C. and to a pressure greater than or equal to 10 GPa, with the temperature and the pressure passing through a temperature and a pressure in a stable region of a wurtzite boron nitride, to obtain the polycrystalline cubic boron nitride (hereinafter, also referred to as "second step"). In this method, the stable region of wurtzite boron nitride is, when the temperature is represented as T° C. and the pressure as P GPa, a region that simultaneously satisfies the following Formula 1 and Formula 2.

$$P \geq -0.0037T + 11.301 \quad \text{Formula 1:}$$

$$P \leq -0.085T + 117 \quad \text{Formula 2:}$$

In the heating and pressurizing path of the second step, an entry temperature into the stable region of wurtzite boron nitride is 500° C. or less, and the second step comprises a step of holding the temperature and the pressure in the heating and pressurizing path for 10 minutes or more at a temperature and a pressure in the stable region of wurtzite boron nitride.

The polycrystalline cubic boron nitride of the first embodiment can be manufactured by the above-described production method. That is, the polycrystalline cubic boron nitride obtained by this production method includes 96% by volume or more of cubic boron nitride, the cubic boron nitride constituting the polycrystalline body has a fine grain size (that is, an average grain size of less than 100 nm), and the dislocation density of cubic boron nitride is large (that is, more than $8 \times 10^{15}/m^2$).

The method (1) for manufacturing the polycrystalline cubic boron nitride of the present disclosure can also comprise a third step of, after the second step, holding the polycrystalline cubic boron nitride obtained in the second step for 10 minutes or more and 30 minutes or less under conditions of a temperature of 1500° C. or more and 2200° C. or less and a pressure of 10 GPa or more (hereinafter, also referred to as "third step").

Figure 2:
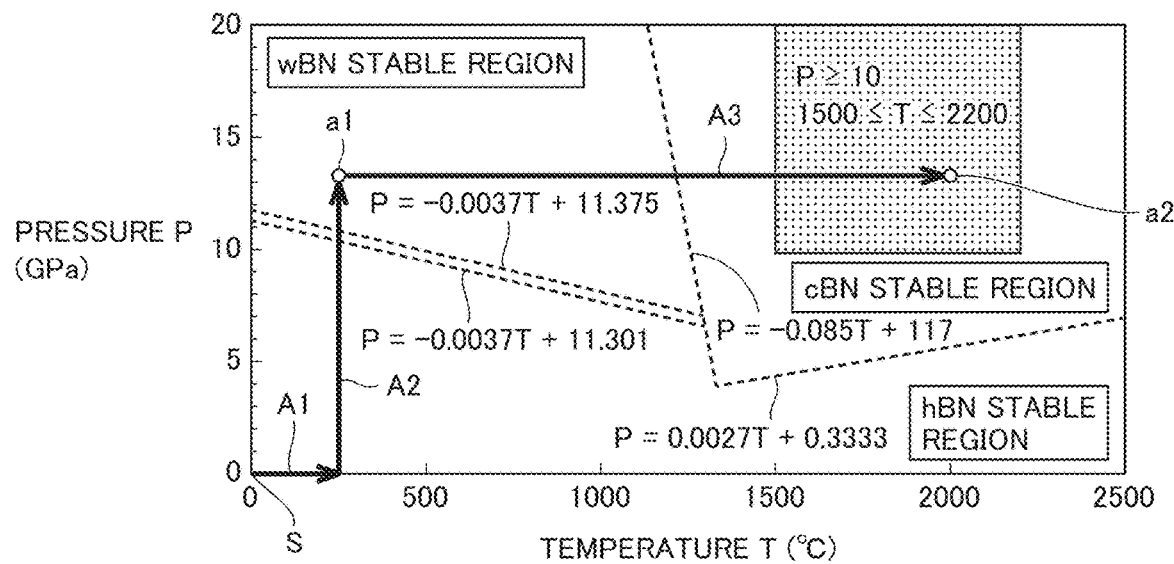
FIG. 2 is a diagram for showing an example of a method for manufacturing the polycrystalline cubic boron nitride according to the present disclosure.
Figure 3:
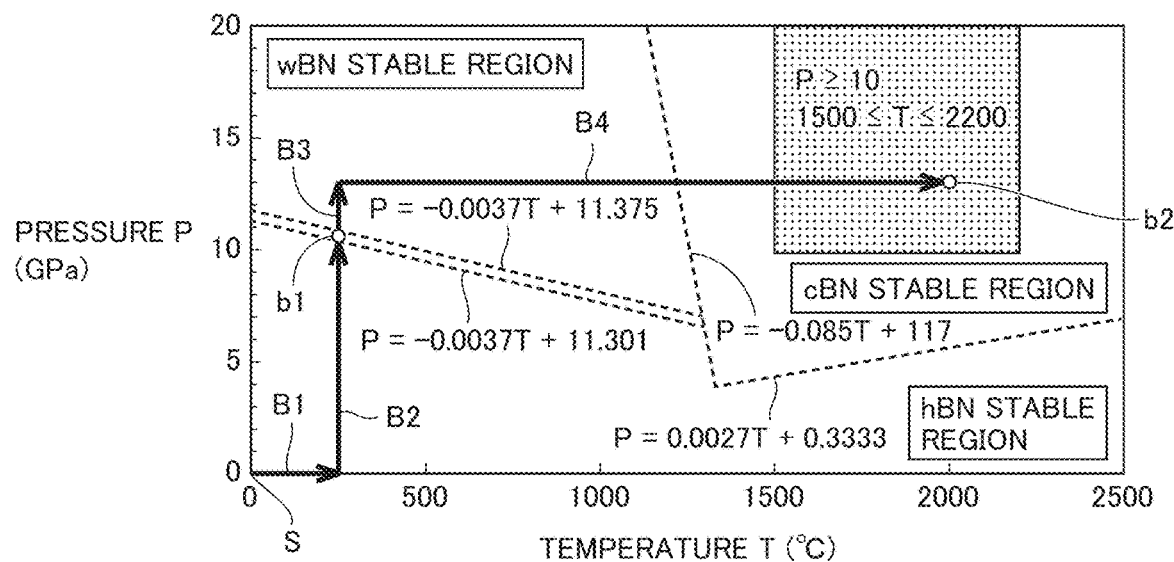
FIG. 3 is a diagram for showing another example of a method for manufacturing the polycrystalline cubic boron nitride according to the present disclosure.

Details of each step of the method (1) for manufacturing the polycrystalline cubic boron nitride of the present disclosure will now be described below with reference to FIGS. 2 to 4. In FIGS. 2 to 4, the arrows indicate the heating and pressurizing path. Further, a circle at the tip of an arrow indicates that the temperature and pressure are held for a certain period of time. Further, the path shown in FIGS. 2 to 4 is an example, and the present invention is not limited to this.

(First Step)

A hexagonal boron nitride powder having a d90 of an equivalent circle diameter (hereinafter, also referred to as "d90") of 0.3 μm or less is prepared as a raw material for the polycrystalline cubic boron nitride.

As the hexagonal boron nitride powder, a powder having a d90 (0.3 μm or less) that is slightly larger than the median diameter d50 (less than 100 nm) of the crystal grains included in the obtained cubic boron nitride crystalline body is used. This is because during the transition from hexagonal boron nitride to cubic boron nitride, the bonds between the hBNs break and the atoms recombine and form new bonds, which results in the cubic boron nitride having a smaller grain size than the grain size of the raw material. The smaller the grain size of the raw material is, the larger the number of grain boundaries where there is no original hBN-hBN bond, and therefore the grain size of the cubic boron nitride after conversion becomes smaller. Conversely, the larger the grain size of the raw material, the larger the particle size of the cubic boron nitride after conversion.

The hexagonal boron nitride powder has a d90 of an equivalent circle diameter of 0.3 μm or less, and preferably 0.2 μm or less. The lower limit of the d90 of an equivalent circle diameter of the hexagonal boron nitride powder is not particularly limited, but from a production viewpoint, it may be 0.05 μm. The hexagonal boron nitride powder has a d90 of an equivalent circle diameter of preferably 0.05 μm or more and 0.3 μm or less, and more preferably 0.05 μm or more and 0.2 μm or less.

As the hexagonal boron nitride powder, a hexagonal boron nitride powder manufactured by a conventionally known synthesis method and a commercially available hexagonal boron nitride powder can both be used.

(Second Step)

Next, the hexagonal boron nitride powder is heated and pressured to a temperature greater than or equal to 1500° C. and less than or equal to 2200° C. (hereinafter also referred to as "attainment temperature") and to a pressure greater than or equal to 10 GPa (hereinafter also referred to as "attainment pressure"), with the temperature and the pressure passing through a temperature and a pressure in a stable region of a wurtzite boron nitride, to obtain a polycrystalline cubic boron nitride (arrows A1, A2, and A3 in FIG. 2, arrows B1, B2, B3, and B4 in FIG. 3, and arrows C1, C2, C3, and C4 in FIG. 4). In the heating and pressurizing path of the second step, the entry temperature into the stable region of wurtzite boron nitride is 500° C. or less. Further, the second step includes a step of holding the temperature and the pressure in the heating and pressurizing path for 10 minutes or more at a temperature and a pressure in the stable region of wurtzite boron nitride (a1 in FIG. 2, b1 in FIG. 3, and c1 and c2 in FIG. 4).

In the present specification, the expression "entry temperature into the stable region of wurtzite boron nitride" means the temperature at which the boron nitride first attains the stable region of wurtzite boron nitride in the heating and pressurizing path of the second step. This entry temperature is, in FIG. 2, the temperature (about 250° C.) at the intersection of the arrow A2 and the line P=−0.0037T+11.301, in FIG. 3, the temperature (about 250° C.) at the intersection of the arrow B2 and the line P=−0.0037T+11.301, and in FIG. 4, the temperature (about 250° C.) at the intersection of the arrow C2 and the line P=−0.0037T+11.301.

In the heating and pressurizing path of the second step, the entry temperature into the stable region of wurtzite boron nitride is 500° C. or less. According to this, the hexagonal boron nitride powder is converted into wurtzite boron nitride in an environment where atomic diffusion does not easily occur, and is then converted into cubic boron nitride. Therefore, the obtained polycrystalline cubic boron nitride has a relatively large number of lattice defects in the polycrystalline body, and the cubic boron nitride has a large dislocation density and a large strain, so that wear resistance is improved. As a result, a tool using the polycrystalline cubic boron nitride can have a long tool life even in precision machining.

The entry temperature into the stable region of wurtzite boron nitride is preferably 300° C. or less, and more preferably 100° C. or less. The lower the entry temperature, the less easily atomic diffusion occurs, and lattice defects tend to increase. The lower limit of the entry temperature may be, for example, 10° C. The entry temperature into the stable region of wurtzite boron nitride is preferably 10° C. or more and 500° C. or less, more preferably 10° C. or more and 300° C. or less, and further preferably 10° C. or more and 100° C. or less.

The second step includes a step of holding the temperature and pressure in the heating and pressurizing path for 10 minutes or more at a temperature and a pressure in the stable region of wurtzite boron nitride. According to this, due to the long holding time in the stable region of wurtzite boron nitride, the conversion rate from hexagonal boron nitride to wurtzite boron nitride is improved, and as a result, the conversion rate to cubic boron nitride is also improved. Accordingly, the obtained polycrystalline cubic boron nitride has an increased cubic boron nitride content, and improved strength and thermal diffusivity. Therefore, a tool using the polycrystalline cubic boron nitride can have a long tool life even in precision machining.

The holding time at a temperature and a pressure in the stable region of wurtzite boron nitride is preferably 15 minutes or more, and more preferably 30 minutes or more. From a production viewpoint, the upper limit of the holding time is preferably 60 minutes. The holding time is preferably 10 minutes or more and 60 minutes or less, more preferably 15 minutes or more and 60 minutes or less, and further preferably 30 minutes or more and 60 minutes or less.

The second step preferably includes a step of holding the temperature and the pressure in the heating and pressurizing path for 10 minutes or more at a temperature and a pressure in a region that simultaneously satisfies the following Formula 1, Formula 2, and Formula 3 (hereinafter, also referred to as "second step A").

$$P \geq -0.0037T + 11.301 \quad \text{Formula 1:}$$

$$P \leq -0.085T + 117 \quad \text{Formula 2:}$$

$$P \leq -0.0037T + 11.375 \quad \text{Formula 3:}$$

The region that simultaneously satisfies Formula 1, Formula 2, and Formula 3 is a region that is in the stable region of wurtzite boron nitride and that is near the boundary between the stable region of hexagonal boron nitride and the stable region of wurtzite boron nitride. By holding in this region for 10 minutes or more, lattice defects are even more likely to occur. As a result, it is thought that the obtained polycrystalline cubic boron nitride has many lattice defects and a large strain in the polycrystalline body, so wear resistance is further improved. Therefore, a tool using the polycrystalline cubic boron nitride can have a longer tool life even in precision machining.

The holding time at a temperature and a pressure in the region that simultaneously satisfies Formula 1, Formula 2, and Formula 3 is more preferably 20 minutes or more. From a production viewpoint, the upper limit of the holding time is preferably 60 minutes. The holding time is preferably 10 minutes or more and 60 minutes or less, more preferably 15 minutes or more and 60 minutes or less, and further preferably 20 minutes or more and 60 minutes or less.

When the second step includes the step of holding the temperature and the pressure in the heating and pressurizing path for 10 minutes or more at a temperature and a pressure in the region that simultaneously satisfies Formula 1, Formula 2, and Formula 3, the second step can include a step of then further holding for 1 minute or more at a temperature and a pressure in a region that satisfies the following Formula 2 and Formula 4 (hereinafter, also referred to as "second step B").

$$P \leq -0.085T + 117 \quad \text{Formula 2:}$$

$$P > -0.0037T + 11.375 \quad \text{Formula 4:}$$

According to this, the conversion rate from hexagonal boron nitride to wurtzite boron nitride is even more improved, and as a result, the conversion rate to cubic boron nitride is also improved. As a result, the obtained polycrystalline cubic boron nitride has an increased cubic boron nitride content, and improved strength and thermal diffusivity. Therefore, a tool using the polycrystalline cubic boron nitride can have a long tool life even in precision machining.

The holding time at a temperature and a pressure in the region that satisfies Formula 2 and Formula 4 is more preferably 10 minutes or more, and further preferably 15 minutes or more. From a production viewpoint, the upper limit of the holding time is preferably 60 minutes. The holding time is preferably 1 minute or more and 60 minutes or less, more preferably 10 minutes or more and 60 minutes or less, and further preferably 15 minutes or more and 60 minutes or less.

In the second step, only the second step A may be performed, or the second step B may be performed after the second step A. Further, the second step may be a step of holding for 10 minutes or more in a region that satisfies Formula 2 and Formula 4.

The attainment pressure in the second step is 10 GPa or more, preferably 12 GPa or more, and more preferably 15 GPa or more. The upper limit of the attainment pressure is not particularly limited, but may be 20 GPa, for example. The attainment pressure in the second step is preferably 10 GPa or more and 20 GPa or less, more preferably 12 GPa or more and 20 GPa or less, and further preferably 15 GPa or more and 20 GPa or less.

In the second step, in the paths of FIGS. 2 to 4, heating is carried out, then pressurizing is carried out, and then heating is further carried out, but the heating and pressurizing paths are not limited to these. The heating and pressurizing path can be any path in which the entry temperature into the stable region of wurtzite boron nitride can be 500° C. or less, holding is possible for 10 minutes or more at a temperature and a pressure in the stable region of wurtzite boron nitride, the attainment temperature can be 1500° C. or more and 2200° C. or less, and the attainment pressure can be 10 GPa or more. For example, heating and pressurization may be performed simultaneously.

As described above, the polycrystalline cubic boron nitride can be obtained by performing the second step on a hexagonal boron nitride powder.

(Third Step)

After the second step, a third step of holding the polycrystalline cubic boron nitride obtained in the second step for 10 minutes or more and 30 minutes or less under conditions of a temperature of 1500° C. or more and 2200° C. or less (hereinafter, also referred to as "final sintering temperature") and a pressure of 10 GPa or more (hereinafter, also referred to as "final sintering pressure") can be performed. As a result of this step, the obtained polycrystalline cubic boron nitride has an increased cubic boron nitride content and can achieve an even longer tool life.

The final sintering temperature is preferably 1500° C. or more and 2000° C. or less. The final sintering pressure is preferably 10 GPa or more and 20 GPa or less, and more preferably 12 GPa or more and 20 GPa or less. The sintering time in the third step is preferably 10 minutes or more and 30 minutes or less, and more preferably 10 minutes or more and 20 minutes or less.

<Characteristics of Polycrystalline Cubic Boron Nitride Obtained by Paths Shown in FIGS. 2 to 4>

[Path of FIG. 2]

In the path of FIG. 2, first, the temperature is increased from the starting point S to a predetermined temperature of 500° C. or less (in FIG. 2, about 250° C.) (arrow A1), then, while maintaining the temperature, the pressure is increased to a pressure in the stable region of wurtzite boron nitride (in FIG. 2, about 13 GPa) (arrow A2), and that temperature (about 250° C.) and pressure (about 13 GPa) are heled for 10 minutes or more (a1 in FIG. 2). Then, while maintaining the pressure (about 13 GPa), the temperature is increased to 1500° C. or more and 2200° C. or less (in FIG. 2, about 2000° C.) (arrow A3), and that temperature (about 2000° C.) and pressure (about 13 GPa) are held for 10 minutes or more and 30 minutes or less (a2 in FIG. 2). In FIG. 2, the second step is indicated by arrows A1, A2, and A3 as well as by a1, and the third step is indicated by a2

In the path of FIG. 2, the entry temperature into the stable region of wurtzite boron nitride is 500° C. or less (about 250° C.). According to this, the hexagonal boron nitride powder is converted into wurtzite boron nitride in an environment where atomic diffusion does not easily occur, and is then converted into cubic boron nitride. Therefore, the obtained polycrystalline cubic boron nitride has a relatively large number of lattice defects in the polycrystalline body, and the cubic boron nitride has a large dislocation density and a large strain, so that wear resistance is improved. Therefore, a tool using the polycrystalline cubic boron nitride can have a long tool life even in precision machining.

In the path of FIG. 2, the temperature and pressure in the heating and pressurizing path are held for 10 minutes or more at a temperature and a pressure in the stable region of wurtzite boron nitride. According to this, since the holding time in the stable region of wurtzite boron nitride is long, the conversion rate from hexagonal boron nitride to wurtzite boron nitride is improved, and as a result, the conversion rate to cubic boron nitride is also improved. Therefore, the obtained polycrystalline cubic boron nitride has an increased cubic boron nitride content, and improved strength and thermal diffusivity. Therefore, a tool using the polycrystalline cubic boron nitride can have a long tool life even in precision machining.

In the path of FIG. 2, the polycrystalline cubic boron nitride obtained in the second step is held for 10 minutes or more and 30 minutes or less under conditions of a temperature of 1500° C. or more and 2200° C. or less and a pressure of 10 GPa or more. According to this, the obtained polycrystalline cubic boron nitride has an increased cubic boron nitride content, and improved strength and thermal diffusivity, and therefore can have a longer tool life.

[Path of FIG. 3]

In the path of FIG. 3, first, the temperature is increased from the starting point S to a predetermined temperature of 500° C. or less (in FIG. 3, about 250° C.) (arrow B1), then, while maintaining the temperature, the pressure is increased to a pressure that simultaneously satisfies the following Formula 1, Formula 2, and Formula 3 (in FIG. 3, about 10.4 GPa) (arrow B2), and that temperature (about 250° C.) and pressure (about 10.4 GPa) are held for 10 minutes or more (b1 in FIG. 3).

$P \geq -0.0037T + 11.301$      Formula 1:

$P \leq -0.085T + 117$      Formula 2:

$P \leq -0.0037T + 11.375$      Formula 3:

Next, while maintaining the temperature (about 250° C.), the pressure is increased in the stable region of wurtzite boron nitride (in FIG. 3, about 13 GPa) (arrow B3). Then, while maintaining the pressure (about 13 GPa), the temperature is increased to 1500° C. or more and 2200° C. or less (in FIG. 3, about 2000° C.) (arrow B4), and that temperature (about 2000° C.) and pressure (about 13 GPa) are held for 10 minutes or more and 30 minutes or less (b2 in FIG. 3). In FIG. 3, the second step is indicated by arrows B1, B2, B3, and B4 as well as by b1, and the third step is indicated by b2.

In the path of FIG. 3, the entry temperature into the stable region of wurtzite boron nitride is 500° C. or less (about 250° C.). According to this, the hexagonal boron nitride powder is converted into wurtzite boron nitride in an environment where atomic diffusion does not easily occur, and is then converted into cubic boron nitride.

Therefore, the obtained polycrystalline cubic boron nitride has a relatively large number of lattice defects in the polycrystalline body, and the cubic boron nitride has a large dislocation density and a large strain, so that wear resistance is improved. Therefore, a tool using the polycrystalline cubic boron nitride can have a long tool life even in precision machining.

In the path of FIG. 3, a step of holding for 10 minutes or more at a temperature and a pressure in a region that simultaneously satisfies Formula 1, Formula 2 and Formula 3 is included. That is, compared with the path of FIG. 2, in the path of FIG. 3, the temperature and the pressure in the heating and pressurizing path are held for 10 minutes or more at a temperature and a pressure that is in the stable region of wurtzite boron nitride and that is closer to the stable region of hexagonal boron nitride (that is, a temperature and a pressure near the boundary between the stable region of wurtzite boron nitride and the stable region of hexagonal boron nitride). As a result, compared with the path of FIG. 2, lattice defects occur even more easily, and it is thought that since the polycrystalline cubic boron nitride obtained in the path of FIG. 3 has more lattice defects in the polycrystalline body and a larger strain than the polycrystalline cubic boron nitride obtained in the path of FIG. 2, wear resistance is further improved. Therefore, a tool using the polycrystalline cubic boron nitride obtained in the path of FIG. 3 can have a longer tool life even in precision machining.

In the path of FIG. 3, the polycrystalline cubic boron nitride obtained in the second step is held for 10 minutes or more and 30 minutes or less under conditions of a temperature of 1500° C. or more and 2200° C. or less and a pressure of 10 GPa or more. According to this, the obtained polycrystalline cubic boron nitride has an increased cubic boron nitride content and can have a longer tool life.

[Path of FIG. 4]

In the path of FIG. 4, first, the temperature is increased from the starting point S to a predetermined temperature of 500° C. or less (in FIG. 4, about 250° C.) (arrow C1), then, while maintaining the temperature, the pressure is increased to a pressure in a region that simultaneously satisfies the following Formula 1, Formula 2, and Formula 3 (in FIG. 4, about 10.4 GPa) (arrow C2), and that temperature (about 250° C.) and pressure (about 10.4 GPa) are held for 10 minutes or more (c1 in FIG. 4).

$P \geq -0.0037T + 11.301$     Formula 1:

$P \leq -0.085T + 117$     Formula 2:

$P \leq -0.0037T + 11.375$     Formula 3:

Next, while maintaining the temperature (about 250° C.), the pressure is increased in the stable region of wurtzite boron nitride (in FIG. 4, about 13 GPa) (arrow C3), and then that temperature (about 250° C.) and pressure (about 13 GPa) are held for 1 minute or more (temperature and pressure indicated by c2 in FIG. 4). That is, in the path of FIG. 4, after a step of holding for 10 minutes or more at a temperature and a pressure that simultaneously satisfies Formula 1, Formula 2 and Formula 3, a step of further holding for 1 minute or more at a temperature and a pressure in a region that satisfies the following Formula 2 and Formula 4 is included.

$P \leq -0.085T + 117$     Formula 2:

$P > -0.0037T + 11.375$     Formula 4:

Then, while maintaining the pressure (about 13 GPa), the temperature is increased to 1500° C. or more and 2200° C. or less (in FIG. 4, about 2000° C.) (arrow C4), and that temperature (about 2000° C.) and pressure (about 13 GPa) are held for 10 minutes or more and 30 minutes or less (c3 in FIG. 4). In FIG. 4, the second step is indicated by arrows C1, C2, C3, and C4 as well as by c1 and c2, and the third step is indicated by c3.

In the path of FIG. 4, the entry temperature into the stable region of wurtzite boron nitride is 500° C. or less (about 250° C.). According to this, the hexagonal boron nitride powder is converted into wurtzite boron nitride in an environment where atomic diffusion does not easily occur, and is then converted into cubic boron nitride. Therefore, the obtained polycrystalline cubic boron nitride has a relatively large number of lattice defects in the polycrystalline body, and the cubic boron nitride has a large dislocation density and a large strain, so that wear resistance is improved. As a result, a tool using the polycrystalline cubic boron nitride can have a long tool life even in precision machining.

In the path of FIG. 4, a step of holding for 10 minutes or more at a temperature and a pressure in a region that simultaneously satisfies Formula 1, Formula 2 and Formula 3 is included. That is, compared with the path of FIG. 2, in the path of FIG. 4, the temperature and the pressure are held for 10 minutes or more at a temperature and a pressure that is in the stable region of wurtzite boron nitride and that is closer to the stable region of hexagonal boron nitride (that is, a temperature and a pressure near the boundary between the stable region of wurtzite boron nitride and the stable region of hexagonal boron nitride). As a result, in the path of FIG. 4, compared with the path of FIG. 2, lattice defects occur even more easily, and it is thought that since the polycrystalline cubic boron nitride obtained in the path of FIG. 4 has more lattice defects in the polycrystalline body and a larger strain than the polycrystalline cubic boron nitride obtained in the path of FIG. 2, wear resistance is further improved. Therefore, a tool using the polycrystalline cubic boron nitride obtained in the path of FIG. 4 can have a longer tool life even in precision machining.

In the path of FIG. 4, after a step of holding for 10 minutes or more at a temperature and a pressure in a region that simultaneously satisfies Formula 1, Formula 2, and Formula 3, the pressure is further increased in the stable region of wurtzite boron nitride (in FIG. 4, about 13 GPa) (arrow C3), and then that temperature (about 250° C.) and pressure (about 13 GPa) are held for 1 minute or more (c2 in FIG. 4). That is, in the path of FIG. 4, after a step of holding for 10 minutes or more at a temperature and a pressure that simultaneously satisfy Formula 1, Formula 2 and Formula 3, a step of further holding for 1 minute or more at a temperature and a pressure in a region that satisfies Formula 2 and Formula 4 is included.

Therefore, in the path of FIG. 4, the conversion rate from hexagonal boron nitride to wurtzite boron nitride is even better than in the path of FIG. 3, and as a result, the conversion rate to cubic boron nitride is further improved. Accordingly, compared with the polycrystalline cubic boron nitride obtained by the path of FIG. 3, the polycrystalline cubic boron nitride obtained by the path of FIG. 4 has an increased cubic boron nitride content, and improved strength and thermal diffusivity. Therefore, a tool using the polycrystalline cubic boron nitride can have an even longer tool life even in precision machining.

In the path of FIG. 4, the polycrystalline cubic boron nitride obtained in the second step is held for 10 minutes or more and 30 minutes or less under conditions of a temperature of 1500° C. or more and 2200° C. or less and a pressure of 10 GPa or more. According to this, the obtained polycrystalline cubic boron nitride has an increased cubic boron nitride content, and can achieve even longer tool life.

<Method (2) for Manufacturing Polycrystalline Cubic Boron Nitride>

A method (2) for manufacturing the polycrystalline cubic boron nitride of the present disclosure is a method for manufacturing the polycrystalline cubic boron nitride of the first embodiment. The method (2) for manufacturing the polycrystalline cubic boron nitride of the present disclosure comprises a step A of preparing pyrolytic boron nitride (hereinafter, also referred to as "step A"), and a step B of heating and pressurizing the pyrolytic boron nitride to a temperature and a pressure in a final sintering region, with the temperature and the pressure passing through a temperature and a pressure in a stable region of a wurtzite boron nitride, to obtain the polycrystalline cubic boron nitride (hereinafter, also referred to "step B"). In this method, the stable region of wurtzite boron nitride is, when the temperature is represented as T (° C.) and the pressure as P (GPa), a region that simultaneously satisfies the following Formula 1 and Formula 2, $P \geq -0.0037T + 11.301$  Formula 1:

$P \leq -0.085T + 117$  Formula 2:

the final sintering region is, when the temperature is represented as T (° C.) and the pressure as P (GPa), a region that simultaneously satisfies the following Formula 4, Formula 5, and Formula 6, $P \geq 12$  Formula 4:

$P \geq -0.085T + 125.5$  Formula 5:

$P \leq -0.085T + 151$  Formula 6:

and in the heating and pressurizing path of step B, an entry temperature into the stable region of wurtzite boron nitride is 500° C. or less.

It should be noted that Formula 2, Formula 5, and Formula 6 exhibit the following relationship. In Formula 2, taking that the temperature when the pressure is P1 (GPa) to be T1 (° C.). In this case, in Formula 5, the temperature when the pressure is P1 (GPa) will be T1+100 (° C.). Further, in Formula 6, the temperature when the pressure is P1 (GPa) will be T1+400 (° C.). That is, when the temperature is increased while keeping the pressure constant, the temperature that satisfies Formula 5 is 100° C. higher than the temperature that satisfies Formula 2, and the temperature that satisfies Formula 6 is 400° C. higher than the temperature that satisfies Formula 2.

The polycrystalline cubic boron nitride of the first embodiment can be manufactured by the above-described manufacturing method. That is, the polycrystalline cubic boron nitride obtained by this production method includes 96% by volume or more of cubic boron nitride, the cubic boron nitride constituting the polycrystalline body has a fine grain size (that is, an average grain size of less than 100 nm), and the dislocation density of cubic boron nitride is large (that is, more than $8 \times 10^{15}$).

The method (2) for manufacturing the polycrystalline cubic boron nitride of the present disclosure can also comprise a step C of, after step B, holding the polycrystalline cubic boron nitride obtained in step B for 10 minutes or more and 30 minutes or less under conditions of a temperature and a pressure in a final sintering region (hereinafter, also referred to as "step C").

Details of each step of the method (2) for manufacturing the polycrystalline cubic boron nitride of the present disclosure will now be described below with reference to FIG. 5. In FIG. 5, the arrows indicate the heating and pressurizing path. Further, a circle at the tip of an arrow indicates that the temperature and pressure are held for a certain period of time. Further, the heating and pressurizing path shown in FIG. 5 is an example, and the present invention is not limited to this.

(Step A)

Pyrolytic boron nitride is prepared as the raw material for the polycrystalline cubic boron nitride. It is thought that because pyrolytic boron nitride has a very fine grain size due to thermal decomposition and grain growth is difficult to occur, dislocation density tends to enter, and the dislocation density tends to increase. As the pyrolytic boron nitride, pyrolytic boron nitride produced by a conventionally known synthesis method and commercially available pyrolytic boron nitride can both be used.

(Step B)

Next, for example, from an ordinary temperature and an ordinary pressure (temperature and pressure indicated by S in FIG. 5, the pyrolytic boron nitride powder is heated and pressurized to a temperature and a pressure in a final sintering region, with the temperature and the pressure passing through a temperature and a pressure in a stable region of a wurtzite boron nitride, (arrows D1, D2, and D3). In the heating and pressurizing path of step B, the entry temperature into the stable region of wurtzite boron nitride is 500° C. or less. In FIG. 5, the entry temperature into the stable region of wurtzite boron nitride is the temperature (about 400° C.) at the intersection of the arrow D2 and the line P=−0.0037T+11.301.

The entry temperature into the stable region of wurtzite boron nitride in step B is 500° C. or less (in the heating and pressurizing path of FIG. 5, about 200° C.). As a result, the hexagonal boron nitride powder is converted into wurtzite boron nitride in an environment where atomic diffusion does not easily occur, and is then converted into cubic boron nitride. For this reason, since the obtained polycrystalline cubic boron nitride has a relatively large number of lattice defects in the polycrystalline body, a large cubic boron nitride dislocation density, and a large strain, wear resistance is improved. Therefore, a tool using the polycrystalline cubic boron nitride can have a long tool life even in precision machining.

The entry temperature into the stable region of wurtzite boron nitride is preferably 300° C. or less, and more preferably 100° C. or less. The lower the entry temperature, the less easily atomic diffusion occurs, and lattice defects tend to increase. The lower limit of the entry temperature may be, for example, 10° C. The entry temperature into the stable region of wurtzite boron nitride is preferably 10° C. or more and 500° C. or less, more preferably 10° C. or more and 300° C. or less, and further preferably 10° C. or more and 100° C. or less.

The temperature and the pressure attained in step B simultaneously satisfy Formula 4, Formula 5, and Formula 6. By heating and pressurizing pyrolytic boron nitride to a temperature and a pressure in the final sintering region that simultaneously satisfy Formula 4, Formula 5, and Formula 6, the obtained polycrystalline cubic boron nitride has an increased cubic boron nitride content and a smaller median diameter d50 of the crystal grains, and an even longer tool life can be achieved.

The pressure attained in step B is represented by Formula 3 (P≥12). That is, the attained pressure is 12 GPa or more. The upper limit of this pressure is not particularly limited, but can be 20 GPa, for example.

In step B, the holding time at the temperature and pressure in the stable region of wurtzite boron nitride can be, for example, 5 minutes or more and 60 minutes or less.

In step B, in the path of FIG. 5, heating is carried out, then pressurizing is carried out, and then heating is further carried out, but the present invention is not limited to this. The heating and pressurizing method can be any path in which the entry temperature into the stable region of wurtzite boron nitride can be 500° C. or more, and the temperature and pressure can be increased to a temperature and a pressure in the final sintering region.

As described above, the polycrystalline cubic boron nitride can be obtained by performing step B on a hexagonal boron nitride powder.

(Step C)

After the above-described step B, a step C of holding the polycrystalline cubic boron nitride obtained in step B for 10 minutes or more and 30 minutes or less under conditions of a temperature and a pressure in the final sintering region can be included. As a result of this step, the obtained polycrystalline cubic boron nitride has an increased cubic boron nitride content and can achieve an even longer tool life.

EXAMPLES

The embodiments will now be described more specifically by way of Examples. However, the present invention is not limited to these Examples.

Example 1

In Example 1, the relationship among the production conditions (1) for a polycrystalline cubic boron nitride, the structure (composition, median diameter of crystal grains, and dislocation density) of the obtained polycrystalline cubic boron nitride, and tool life when performing precision machining with a tool using the polycrystalline cubic boron nitride was investigated.

<Production of Polycrystalline Cubic Boron Nitride>

The polycrystalline cubic boron nitrides of Sample 1-1 to Sample 8 were manufactured according to the following procedure.

(First Step)

Six grams of a hexagonal boron nitride powder (d90: 0.3 μm) was prepared. The hexagonal boron nitride powder was placed into a molybdenum capsule and arranged in an ultrahigh pressure and high temperature generator.

(Second Step and Third Step)

[Sample 1-1, Sample 1-2, Sample 4-3, Sample 4-4, Sample 7, and Sample 8]

Using the above-described hexagonal boron nitride powder and ultrahigh pressure and high temperature generator, the temperature and/or pressure were increased from the temperature and pressure shown in the "temperature" and "pressure" columns of the "starting point" in Table 1 to the temperature and pressure shown in the "attainment temperature" and "attainment pressure" columns of the "first stage", and held there for the length of time shown in the "holding time" column. It is noted that the "–" symbol in the holding time column indicates that the temperature and/or pressure was not held at the "attainment temperature" and "attainment pressure" of the "first stage" and proceeded to the second stage.

Then, while maintaining the temperature, the pressure was increased to the pressure shown in the "attainment pressure" column of the "second stage" in Table 1, and held there for the length of time shown in the "holding time" column.

Then, while maintaining the pressure, the temperature was increased to the temperature shown in the "attainment temperature" column of the "third stage" in Table 1, and held there for the length of time shown in the "holding time" column, whereby a polycrystalline cubic boron nitride was obtained. In Sample 1-1, Sample 1-2, Sample 4-3, Sample 4-4, Sample 7, and Sample 8, the high temperature and high pressure treatment at the "attainment temperature" and "attainment pressure" for the "holding time" shown in the "third stage" corresponds to the third step.

[Sample 1-3 and Sample 1-4]

Using the above-described hexagonal boron nitride powder and ultrahigh pressure and high temperature generator, while maintaining the temperature at the temperature shown in the "temperature" column of the "starting point" in Table 1, the pressure was increased from the pressure shown in the "pressure" column of the "starting point" to the pressure shown in the "attainment pressure" column of the "first stage", and held there for the length of time shown in the "holding time" column.

Then, while maintaining the pressure, the temperature was increased to the temperature shown in the "attainment temperature" column of the "second stage" in Table 1, and held there for the length of time shown in the "holding time" column, whereby a polycrystalline cubic boron nitride was obtained. In Sample 1-3 and Sample 1-4, the high temperature and high pressure treatment at the "attainment temperature" and "attainment pressure" for the "holding time" shown in the "second stage" corresponds to the third step.

[Sample 2, Sample 3, Sample 4-1, Sample 4-2, Sample 5 and Sample 6]

Using the above-described hexagonal boron nitride powder and ultrahigh pressure and high temperature generator, while maintaining the pressure at the pressure shown in the "pressure" column of the "starting point" in Table 1, the temperature was increased from the temperature shown in the "temperature" column of the "starting point" to the "attainment temperature" column of the "first stage".

Then, while maintaining the temperature, the pressure was increased to the pressure shown in the "attainment pressure" column of the "second stage" in Table 1, and held there for the length of time shown in the "holding time" column.

Then, while maintaining the temperature, the pressure was increased to the pressure shown in the "attainment pressure" column of the "third stage" in Table 1, and held there for the length of time shown in the "holding time" column.

Then, while maintaining the pressure, the temperature was increased to the temperature shown in the "attainment temperature" column of the "fourth stage" in Table 1, and held there for the length of time shown in the "holding time" column, whereby a polycrystalline cubic boron nitride was obtained. In Sample 2, Sample 3, Sample 4-1, Sample 4-2, Sample 5, and Sample 6, the high temperature and high pressure treatment at the "attainment temperature" and "attainment pressure" for the "holding time" shown in the "fourth stage" corresponds to the third step.

<Evaluation>

(Measurement of Composition)

The content of the cubic boron nitride in the obtained polycrystalline cubic boron nitrides was measured by X-ray diffraction. Since the specific X-ray diffraction method is as shown in the first embodiment, a description thereof will not be repeated here. The results are shown in the "cBN content" column of Table 1.

In all the samples, components other than cubic boron nitride, hexagonal boron nitride, compressed hexagonal boron nitride, and wurtzite boron nitride were not identified.

(Measurement of Dislocation Density)

The dislocation density of the cubic boron nitride in the obtained polycrystalline cubic boron nitrides was calculated by using the modified Williamson-Hall method and the modified Warren-Averbach method to analyze the line profile obtained by X-ray diffraction measurement. The specific method for calculating the dislocation density is as described in the first embodiment, and therefore a description thereof will not be repeated here. The results are shown in the "Dislocation density" column of Table 1.

(Measurement of Median Diameter d50 of Crystal Grains)

The median diameter d50 of an equivalent circle diameter was measured for the crystal grains included in the obtained polycrystalline cubic boron nitrides. Since the specific method is as shown in the first embodiment, a description thereof will not be repeated here. The results are shown in the "Median diameter (d50)" column of Table 1.

(Cutting Test)

The obtained polycrystalline cubic boron nitrides were cut with a laser and finished to produce a ball end mill. Using this ball end mill, spherical machining of STAVAX ESR® (stainless tool steel manufactured by Uddeholm) was performed under the following cutting conditions to evaluate tool performance.

(Cutting Conditions)

Work material: STAVAX ESR® (stainless tool steel manufactured by Uddeholm)
Tool shape: Ball end mill, R 0.5 mm per blade
Rotation speed: 50000 rpm
Feed: 1000 mm/min
Depth of cut (ap): 0.005 mm
Cutting width (ae): 0.005 mm
With oil mist
Machined into a φ10 hemispherical shape These cutting conditions correspond to precision machining.

(Tool performance evaluation)

The work material was cut under the cutting conditions described above, and the number of dimples having a φ10 hemispherical shape until the surface roughness Ra of the machined surface of the work material exceeded 0.2 μm was measured. A larger number of dimples indicates better wear resistance and a longer tool life. The specific method for measuring the surface roughness Ra of the machined surface is as follows.

First, the hemispherical shape obtained by machining is observed from above. At this time, the hemispherical shape is observed as a circle. A measurement visual field of 0.530 mm×0.0706 mm is set so as to include a position that is ⅓ of the radius away from the center of the circle in the radial direction.

The measurement visual field was measured using a scanning white interferometer ("NewView"®, manufactured by Zygo Corporation), the surface shape data was entered, and Ra was calculated in the range of 0.05 mm in the pick feed direction.

The results are shown in the "number of dimples" column of Table 1.

TABLE 1

| | | | Heating and pressurizing path | | | | | | | |
|---|---|---|---|---|---|---|---|---|---|---|
| | Starting point | | First stage | | | Second stage | | | Third stage | |
| Sample No. | Temperature (° C.) | Pressure (GPa) | Attainment temperature (° C.) | Attainment pressure (GPa) | Holding time (minutes) | Attainment temperature (° C.) | Attainment pressure (GPa) | Holding time (minutes) | Attainment temperature (° C.) | Attainment pressure (GPa) |
| 1-1 | 25 | 0 | 25 | 11.25 | 10 | 25 | 13 | 15 | 1700 | 13 |
| 1-2 | 25 | 0 | 25 | 11.25 | 10 | 25 | 13 | 1 | 1700 | 13 |
| 1-3 | 25 | 0 | 25 | 13 | 15 | 1700 | 13 | 5 | — | — |
| 1-4 | 25 | 0 | 25 | 13 | 1 | 1700 | 13 | 5 | — | — |
| 2 | 25 | 0 | 250 | 0 | — | 250 | 10.40 | 10 | 250 | 13 |
| 3 | 25 | 0 | 350 | 0 | — | 350 | 10.05 | 10 | 350 | 13 |
| 4-1 | 25 | 0 | 450 | 0 | — | 450 | 9.65 | 10 | 450 | 13 |
| 4-2 | 25 | 0 | 450 | 0 | — | 450 | 9.65 | 10 | 450 | 13 |
| 4-3 | 25 | 0 | 450 | 0 | — | 450 | 13 | 15 | 1700 | 13 |
| 4-4 | 25 | 0 | 450 | 0 | — | 450 | 13 | 1 | 1700 | 13 |
| 5 | 25 | 0 | 550 | 0 | — | 550 | 9.30 | 10 | 550 | 13 |
| 6 | 25 | 0 | 700 | 0 | — | 700 | 8.75 | 10 | 700 | 13 |
| 7 | 25 | 0 | 450 | 0 | — | 450 | 11 | 15 | 1700 | 11 |
| 8 | 25 | 0 | 450 | 0 | — | 450 | 9.6 | 15 | 1700 | 9.6 |

TABLE 1-continued

| | | Heating and pressurizing path | | | wBN Stable region | Polycrystalline cubic boron nitride | | | Evaluation |
|---|---|---|---|---|---|---|---|---|---|
| | Third | Fourth stage | | | | | | | |
| Sample No. | stage Holding time (minutes) | Attainment Temperature (° C.) | Attainment pressure (GPa) | Holding time (minutes) | entry temperature (° C.) | cBN content (% by volume) | Median diameter (d50) (μm) | Dislocation density ($\times 10^{15}/m^2$) | Number of dimples (number) |
| 1-1 | 5 | — | — | — | 25 | 98.2 | 79 | 11.0 | 50 |
| 1-2 | 5 | — | — | — | 25 | 98.2 | 80 | 10.7 | 48 |
| 1-3 | — | — | — | — | 25 | 98.1 | 78 | 10.5 | 47 |
| 1-4 | — | — | — | — | 25 | 98.1 | 79 | 7.6 | 12 |
| 2 | 15 | 1700 | 13 | 5 | 250 | 98.0 | 78 | 9.5 | 44 |
| 3 | 15 | 1700 | 13 | 5 | 350 | 97.9 | 81 | 8.9 | 42 |
| 4-1 | 15 | 1700 | 13 | 5 | 450 | 98.0 | 80 | 8.6 | 41 |
| 4-2 | 1 | 1700 | 13 | 5 | 450 | 97.6 | 81 | 8.4 | 40 |
| 4-3 | 5 | — | — | — | 450 | 97.8 | 81 | 8.2 | 39 |
| 4-4 | 5 | — | — | — | 450 | 97.9 | 81 | 7.2 | 10 |
| 5 | 15 | 1700 | 13 | 5 | 550 | 97.5 | 81 | 6.9 | 9 |
| 6 | 15 | 1700 | 13 | 5 | 700 | 97.5 | 81 | 6.2 | 7 |
| 7 | 5 | — | — | — | 450 | 96.3 | 80 | 8.3 | 37 |
| 8 | 5 | — | — | — | 450 | 95.8 | 81 | 8.1 | 5 |

<Consideration>

[Sample 1-1 to Sample 1-3] The production method of each of Sample 1-1 to Sample 1-3 corresponds to the Example. The polycrystalline cubic boron nitrides of Sample 1-1 to Sample 1-3 all include 96% by volume or more of cubic boron nitride, had a cubic boron nitride dislocation density of more than $8 \times 10^{15}/m^2$, and had a median diameter d50 of the crystal grains of less than 100 nm, and hence corresponded to the Example. It was confirmed that a tool using the polycrystalline cubic boron nitrides of Sample 1-1 to Sample 1-3, even in precision machining, had a long tool life.

Comparing the number of dimples of Sample 1-1 to Sample 1-3, Sample 1-1 and Sample 1-2 had more dimples than Sample 1-3. It is thought that this is because for Sample 1-1 and Sample 1-2, the attainment temperature and the attainment pressure in the first stage were a temperature and a pressure that simultaneously satisfy Formula 1, Formula 2, and Formula 3, and a step of holding for 10 minutes or more at that temperature and pressure was included, whereas for Sample 1-3, which did not include such a step, because lattice defects occurred more easily and the cubic boron nitride dislocation density was large, and wear resistance was improved.

In addition, comparing the number of dimples of Sample 1-1 and Sample 1-2, Sample 1-1 had more dimples than Sample 1-2. It is thought that this is because Sample 1-1 had a longer holding time at the attainment temperature and attainment pressure in the second stage (that is, in the stable region of wurtzite boron nitride) than Sample 1-2, and therefore the conversion rate from hexagonal boron nitride to wurtzite boron nitride was further improved, resulting in a higher conversion rate to cubic boron nitride than for Sample 1-2, and a larger cubic boron nitride content.

[Sample 1-4]

The production method of Sample 1-4 corresponds to a Comparative Example that does not include a step of holding for 10 minutes or more at a temperature and a pressure in the stable region of wurtzite boron nitride. The polycrystalline cubic boron nitride of Sample 1-4 had a cubic boron nitride dislocation density of $7.6 \times 10^{15}/m^2$, which corresponds to a Comparative Example. A tool using the polycrystalline cubic boron nitride of Sample 1-4 had a short tool life. It is thought that this is because in the polycrystalline cubic boron nitride of Sample 1-4, the cubic boron nitride dislocation density was low, so that hardness decreased and wear resistance deteriorated, thereby worsening the surface roughness of the machined surface of the work material. In Sample 1-4, the reason why the cubic boron nitride had a low dislocation density is inferred to be due to the short holding time in the stable region of wurtzite boron nitride.

[Sample 2, Sample 3, and Sample 4-1 to Sample 4-3] The production method of each of Sample 2, Sample 3, and Sample 4-1 to Sample 4-3 corresponds to the Example. The polycrystalline cubic boron nitrides of Sample 2, Sample 3, and Sample 4-1 to Sample 4-3 all included 96% by volume or more of cubic boron nitride, had a cubic boron nitride dislocation density of more than $8 \times 10^{15}/m^2$, and had a median diameter d50 of the crystal grains of less than 100 nm, and hence correspond to the Example. It was confirmed that a tool using the polycrystalline cubic boron nitrides of Sample 2, Sample 3, and Sample 4-1 to Sample 4-3 had a long tool life even in precision machining.

Comparing the tool life of Sample 4-1 to Sample 4-3, Sample 4-1 and Sample 4-2 had a longer tool life than Sample 4-3. It is thought that this is because for Sample 4-1 and Sample 4-2, the attainment temperature and the attainment pressure in the second stage were a temperature and a pressure that simultaneously satisfy Formula 1, Formula 2, and Formula 3, and a step of holding for 10 minutes or more at that temperature and pressure was included, whereas for Sample 4-3, which did not include such a step, lattice defects occurred more easily, and wear resistance was large.

[Sample 4-4]

The production method of Sample 4-4 corresponds to a Comparative Example that does not include a step of holding for 10 minutes or more at a temperature and a pressure in the stable region of wurtzite boron nitride. The polycrystalline cubic boron nitride of Sample 4-4 had a cubic boron nitride dislocation density of $7.2 \times 10^{15}/m^2$, which corresponds to a Comparative Example. A tool using the polycrystalline cubic boron nitride of Sample 4-4 had a short tool life. It is thought that this is because in the polycrystalline cubic boron nitride of Sample 4-4, the cubic boron nitride dislocation density was low, so that hardness decreased and wear resistance deteriorated, thereby worsening the surface roughness of the machined surface of the work material. In Sample 4-4, the reason why the cubic boron nitride had a low dislocation density is inferred to be due to the short holding time in the stable region of wurtzite boron nitride.

[Sample 5 and Sample 6]

The production method of each of Sample 5 and Sample 6 corresponds to a Comparative Example in which the entry temperature into the stable region of wurtzite boron nitride is more than 500° C. The polycrystalline cubic boron nitrides of both of Sample 5 and Sample 6 had a cubic boron nitride dislocation density of $8\times10^{15}/m^2$ or less, which corresponds to a Comparative Example. A tool using the polycrystalline cubic boron nitrides of Sample 5 and Sample 6 had a short tool life. It is thought that this is because in the production method of Sample 5 and Sample 6, the entry temperature into the stable region of wurtzite boron nitride was more than 500° C., so lattice defects did not easily occur, the cubic boron nitride dislocation density in the obtained polycrystalline cubic boron nitride was smaller, and wear resistance deteriorated.

[Sample 7]

The production method of Sample 7 corresponds to the Example. The polycrystalline cubic boron nitride of Sample 7 included 96% by volume or more of cubic boron nitride, had a cubic boron nitride dislocation density of more than $8\times10^{15}/m^2$, and had a median diameter d50 of the crystal grains of less than 100 nm, and hence corresponds to the Example. It was confirmed that a tool using the polycrystalline cubic boron nitrides of Sample 7 had a long tool life even in precision machining.

[Sample 8]

The production method of Sample 8 corresponds to a Comparative Example in which the attainment pressure of the second step (attainment pressure of the third stage) is less than 10 GPa. The polycrystalline cubic boron nitride of Sample 8 has a cubic boron nitride content of less than 96% by volume, which corresponds to a Comparative Example. A tool using the polycrystalline cubic boron nitride of Sample 8 had a short tool life. It is thought that this is because in the production method of Sample 8, the attainment pressure of the second step (attainment pressure of the third stage) is less than 10 GPa, the final sintering pressure is also less than 10 GPa, the conversion rate to cubic boron nitride decreases, and the cubic boron nitride content of the obtained polycrystalline cubic boron nitride is small.

Example 2

In Example 2, the relationship among the production conditions of the above-described production method (2) of a polycrystalline cubic boron nitride, the structure (composition, median diameter of crystal grains, and dislocation density) of the obtained polycrystalline cubic boron nitride, and tool life when performing precision machining with a tool using the polycrystalline cubic boron nitride was investigated.

<Production of Polycrystalline Cubic Boron Nitride>

The polycrystalline cubic boron nitrides of Sample 9 to Sample 12 were manufactured according to the following procedure.

[Sample 9 to Sample 12]

(Step A)

Six grams of pyrolytic boron nitride was prepared. The pyrolytic boron nitride was placed into a molybdenum capsule and arranged in an ultrahigh pressure and high temperature generator.

(Step B and Step C)

Using the above-described pyrolytic boron nitride and ultrahigh pressure and high temperature generator, while maintaining the pressure at the pressure shown in the "pressure" column of the "starting point" in Table 1, the temperature was increased from the temperature shown in the "temperature" column of the "starting point" to the "attainment temperature" column of the "first stage".

Then, while maintaining the temperature, the pressure was increased to the pressure shown in the "attainment pressure" column of the "second stage" in Table 1.

Then, while maintaining the pressure, the temperature was increased to the temperature shown in the "attainment temperature" column of the "third stage" in Table 1 and held for 15 minutes, whereby polycrystalline cubic boron nitride was obtained. In Sample 9 to 12, the high temperature/high pressure treatment for 15 minutes at the "attainment temperature" and "attainment pressure" shown in the "third stage" corresponds to step C.

<Evaluation>

(Measurement of Composition, Dislocation Density, and Median Diameter d50 of Crystal Grains)

The cubic boron nitride content, the cubic boron nitride dislocation density, and the median diameter d50 of crystal grains for the obtained polycrystalline cubic boron nitrides were measured. Since the specific measurement methods are as shown in the first embodiment, a description thereof will not be repeated here. It is noted that, in all the samples, components other than cubic boron nitride, hexagonal boron nitride, compressed hexagonal boron nitride, and wurtzite boron nitride were not identified in the measurement of the composition.

The results are shown in the "cBN content", "dislocation density", and "median diameter (d50)" columns of Table 2.

(Cutting Test)

The obtained polycrystalline cubic boron nitrides were cut with a laser and finished to produce a ball end mill. Using this ball end mill, spherical machining of STAVAX ESR® (stainless tool steel) was performed under the following cutting conditions to evaluate tool performance.

(Cutting Conditions)

Work material: STAVAX ESR® (stainless tool steel manufactured by Uddeholm)
Tool shape: Ball end mill, R 0.6 mm per blade
Rotation speed: 53000 rpm
Feed: 1000 mm/min
Depth of cut (ap): 0.005 mm
Cutting width (ae): 0.005 mm
With oil mist
Machined into a φ12 hemispherical shape These cutting conditions correspond to precision machining.

(Tool Performance Evaluation)

The work material was cut under the cutting conditions described above, and the number of dimples having a φ12 hemispherical shape until the surface roughness Ra of the machined surface of the work material exceeded 0.15 μm was measured. A larger number of dimples indicates better damage resistance and a longer tool life. Since the specific method for measuring the surface roughness Ra of the machined surface is the same as the method described in Example 1, a description thereof will not be repeated here.

The results are shown in the "number of dimples" column of Table 2.

diameter of crystal grains, and dislocation density) of the obtained polycrystalline cubic boron nitride, and tool life when performing precision machining with a tool using the polycrystalline cubic boron nitride was investigated.

TABLE 2

| | | | Heating and pressurizing path | | | | |
|---|---|---|---|---|---|---|---|
| | | | First stage | | Second stage | | Third stage |
| | Starting point | | Attainment | Attainment | Attainment | Attainment | Attainment |
| Sample No. | Temperature (° C.) | Pressure (GPa) | temperature (° C.) | pressure (GPa) | temperature (° C.) | pressure (GPa) | temperature (° C.) |
| 9 | 25 | 0 | 200 | 0 | 200 | 14.8 | 1270 |
| 10 | 25 | 0 | 200 | 0 | 200 | 14.8 | 1320 |
| 11 | 25 | 0 | 200 | 0 | 200 | 14.8 | 1570 |
| 12 | 25 | 0 | 200 | 0 | 200 | 14.8 | 1650 |

| | Heating and pressurizing path | | Polycrystalline cubic boron nitride | | | |
|---|---|---|---|---|---|---|
| Sample No. | Third stage Attainment pressure (GPa) | wBN Stable region entry temperature (° C.) | cBN content (% by volume) | Median diameter (d50) (μm) | Dislocation density ($\times 10^{15}/m^2$) | Evaluation Number of dimples (number) |
| 9 | 14.8 | 200 | 95.4 | 54 | 9.5 | 8 |
| 10 | 14.8 | 200 | 96.2 | 66 | 9.4 | 45 |
| 11 | 14.8 | 200 | 96.5 | 82 | 9.2 | 42 |
| 12 | 14.8 | 200 | 96.6 | 108 | 9.0 | 21 |

<Consideration>

[Sample 9] The production method of Sample 9 corresponds to a Comparative Example in which the attainment temperature of step B (attainment temperature of the third stage) is low, and outside the final sintering region. The polycrystalline cubic boron nitride of Sample 9 had a cubic boron nitride content of less than 96% by volume, which corresponds to a Comparative Example. A tool using the polycrystalline cubic boron nitride of Sample 9 had a short tool life. It is thought that this is because in the production method of Sample 9, since the attainment temperature of step B (attainment temperature of the third stage) was low and the final sintering temperature was also low, the conversion rate to cubic boron nitride was lower, the cubic boron nitride content of the obtained polycrystalline cubic boron nitride was small, and the tool was damaged.

[Sample 10 to Sample 12]

The production method of each of Samples 10 to 12 corresponds to the Example. The polycrystalline cubic boron nitrides of Samples 10 to 12 all included 96% by volume or more of cubic boron nitride, had a cubic boron nitride dislocation density of more than $8 \times 10^{15}/m^2$, and had a median diameter d50 of the crystal grains of less than 100 nm, and hence correspond to the Example. It was confirmed that a tool using the polycrystalline cubic boron nitrides of Sample 10 to Sample 12, even in precision machining, the tool had a long tool life.

Example 3

In Example 3, the relationship among the production conditions of the above-described method (1) for manufacturing a polycrystalline cubic boron nitride, the structure (composition (cubic boron nitride content, hexagonal boron nitride content, and wurtzite boron nitride content), median <Production of Polycrystalline Cubic Boron Nitride>

The polycrystalline cubic boron nitrides of Sample 13 to Sample 17 were manufactured according to the following procedure.

(First Step)

Six grams of a hexagonal boron nitride powder (d90: 0.3 μm) was prepared. The hexagonal boron nitride powder was placed into a molybdenum capsule and arranged in an ultrahigh pressure and high temperature generator.

(Second Step and Third Step)

[Sample 13, Sample 16, and Sample 17]

Using the above-described hexagonal boron nitride powder and ultrahigh pressure and high temperature generator, the temperature or pressure were increased from the temperature and pressure shown in the "temperature" and "pressure" columns of the "starting point" in Table 3 to the temperature and pressure shown in the "attainment temperature" and "attainment pressure" columns of the "first stage", and held there for the length of time shown in the "holding time" column. It is noted that the "–" symbol in the holding time column indicates that the temperature and/or pressure was not held at the "attainment temperature" and "attainment pressure" of the "first stage" and proceeded to the second stage.

Then, while maintaining the temperature, the pressure was increased to the pressure shown in the "attainment pressure" column of the "second stage" in Table 3, and held there for the length of time shown in the "holding time" column.

Then, while maintaining the pressure, the temperature was increased to the temperature shown in the "attainment temperature" column of the "third stage" in Table 3, and held there for the length of time shown in the "holding time" column, whereby a polycrystalline cubic boron nitride was obtained. In Sample 13, Sample 16, and Sample 17, the high temperature and high pressure treatment at the "attainment temperature" and "attainment pressure" for the "holding time" shown in the "third stage" corresponds to the third step.

[Sample 14 and Sample 15]

Using the above-described hexagonal boron nitride powder and ultrahigh pressure and high temperature generator, while maintaining the pressure at the pressure shown in the "pressure" column of the "starting point" in Table 3, the temperature was increased from the temperature shown in the "temperature" column of the "starting point" to the "attainment temperature" column of the "first stage".

Then, while maintaining the temperature, the pressure was increased to the pressure shown in the "attainment pressure" column of the "second stage" in Table 3, and held there for the length of time shown in the "holding time" column.

Then, while maintaining the temperature, the pressure was increased to the pressure shown in the "attainment pressure" column of the "third stage" in Table 3, and held there for the length of time shown in the "holding time" column.

Then, while maintaining the pressure, the temperature was increased to the temperature shown in the "attainment temperature" column of the "fourth stage" in Table 3, and held there for the length of time shown in the "holding time" column, whereby a polycrystalline cubic boron nitride was obtained. In Sample 14, the high temperature and high pressure treatment at the "attainment temperature" and "attainment pressure" for the "holding time" shown in the "fourth stage" corresponds to the third step.

<Evaluation>

(Measurement of Composition, Dislocation Density, and Median Diameter d50 of Crystal Grains)

The composition (cubic boron nitride content, hexagonal boron nitride content, and wurtzite boron nitride content), the cubic boron nitride dislocation density, and the median diameter d50 of crystal grains for the obtained polycrystalline cubic boron nitrides were measured. Since the specific measurement methods are as shown in the first embodiment, a description thereof will not be repeated here. The results are shown in the "cBN content", "hBN content", "compressed hBN content", "wBN content", "dislocation density", and "median diameter (d50)" columns of Table 3.

(Cutting Test)

The obtained polycrystalline cubic boron nitrides were cut with a laser and finished to produce a ball end mill. Using this ball end mill, spherical machining of STAVAX ESR® (stainless tool steel manufactured by Uddeholm) was performed under the following cutting conditions to evaluate tool performance.

(Cutting Conditions)
Work material: STAVAX ESR® (stainless tool steel manufactured by Uddeholm)
Tool shape: Ball end mill, R 0.5 mm per blade
Rotation speed: 16000 rpm
Feed: 1000 mm/min
Depth of cut (ap): 0.005 mm
Cutting width (ae): 0.005 mm
With oil mist
Machined into a ϕ8 hemispherical shape These cutting conditions correspond to precision machining. Further, in these conditions, the rotation speed is lower and the cutting resistance is higher than in the cutting tests in Example 1 and Example 2.

(Tool Performance Evaluation)

The work material was cut under the cutting conditions described above, and the number of dimples having a ϕ8 hemispherical shape until the surface roughness Ra of the machined surface of the work material exceeded 0.2 μm was measured. A larger number of dimples indicates better wear resistance and a longer tool life. Since the specific method for measuring the surface roughness Ra of the machined surface is the same as the method described in Example 1, a description thereof will not be repeated here. The results are shown in the "number of dimples" column of Table 3.

TABLE 3

| | | | Heating and pressurizing path | | | | | |
| | | | First stage | | | Second stage | | |
| | Starting point | | Attainment | Attainment | Holding | Attainment | Attainment | Holding |
| Sample No. | Temperature (° C.) | Pressure (GPa) | temperature (° C.) | pressure (GPa) | time (minutes) | temperature (° C.) | pressure (GPa) | time (minutes) |
|---|---|---|---|---|---|---|---|---|
| 13 | 25 | 0 | 25 | 11.25 | 10 | 25 | 13 | 15 |
| 14 | 25 | 0 | 250 | 0 | — | 250 | 10.4 | 10 |
| 15 | 25 | 0 | 450 | 0 | — | 450 | 9.65 | 10 |
| 16 | 25 | 0 | 490 | 0 | — | 490 | 9.5 | 10 |
| 17 | 25 | 0 | 25 | 11.25 | 15 | 25 | 14 | 5 |

| | Heating and pressurizing path | | | | | | |
| | Third stage | | | Fourth stage | | | wBN Stable |
| Sample No. | Attainment temperature (° C.) | Attainment pressure (GPa) | Holding time (minutes) | Attainment temperature (° C.) | Attainment pressure (GPa) | Holding time (minutes) | region entry temperature (° C.) |
|---|---|---|---|---|---|---|---|
| 13 | 1600 | 13 | 10 | — | — | — | 25 |
| 14 | 250 | 13 | 10 | 1650 | 13 | 10 | 350 |
| 15 | 450 | 14 | 10 | 1800 | 14 | 20 | 450 |
| 16 | 1600 | 9.5 | 10 | — | — | — | 450 |
| 17 | 2350 | 14 | 20 | — | — | — | 1000 |

TABLE 3-continued

| | Polycrystalline cubic boron nitride | | | | | | |
|---|---|---|---|---|---|---|---|
| Sample No. | cBN content (% by volume) | hBN content (% by volume) | Compressed hBN content (% by volume) | wBN content (% by volume) | Median diameter (d50) (nm) | Dislocation density (×10$^{15}$/m$^2$) | Evaluation Number of dimples (number) |
| 13 | 96.38 | 0.02 | 0.5 | 3.1 | 70 | 11.8 | 41 |
| 14 | 97.1 | 0 | 0.3 | 2.6 | 75 | 9.7 | 33 |
| 15 | 96.3 | 0 | 0 | 3.7 | 82 | 9.8 | 34 |
| 16 | 94.2 | 0.3 | 3.1 | 2.4 | 71 | 9.9 | 8 |
| 17 | 100 | 0 | 0 | 0 | 410 | 4 | 5 |

<Consideration>

[Sample 13 to Sample 15]

The production method of each of Sample 13 to Sample 15 corresponded to the Example. The polycrystalline cubic boron nitrides of Sample 13 to Sample 15 all included 96% by volume or more of cubic boron nitride, had a cubic boron nitride dislocation density of more than 8×10$^{15}$/m$^2$, and had a median diameter d50 of the crystal grains of less than 100 nm, and hence corresponded to the Example. It was confirmed that a tool using the polycrystalline cubic boron nitrides of Sample 13 to Sample 15 had a large number of dimples, and even in precision machining, the tool was not susceptible to damage and had a long tool life.

[Sample 16]

The production method of Sample 16 corresponds to a Comparative Example in which the attainment pressure of the second step (attainment pressure of the third stage) is less than 10 GPa. The polycrystalline cubic boron nitride of Sample 16 had a cubic boron nitride content of less than 96% by volume, which corresponds to a Comparative Example. A tool using the polycrystalline cubic boron nitride of Sample 16 had a small number of dimples and had a short tool life. This is thought to be because the polycrystalline cubic boron nitride of Sample 16 has a small cubic boron nitride content, which reduces strength and thermal diffusivity, so that the tool is easily damaged, resulting in deterioration of the surface roughness of the machined surface of the work material. It is thought that the reason for the low cubic boron nitride content is that because the attainment pressure of the heating and pressurizing step was less than 10 GPa, the conversion rate from hexagonal boron nitride into cubic boron nitride was reduced.

[Sample 17]

The production method of Sample 17 corresponds to a Comparative Example in which the attainment temperature of the second step (attainment temperature of the third stage) is higher than 2200° C. The cubic boron nitride of Sample 17 had a median diameter d50 of the crystal grains of more than 100 nm and a cubic boron nitride dislocation density of 8×10$^{15}$/m$^2$ or less, which corresponds to a Comparative Example. A tool using the polycrystalline cubic boron nitride of Sample 17 had a low number of dimples and a short tool life. It is thought that this is because the polycrystalline cubic boron nitride of Sample 17 had a low dislocation density, worse wear resistance, and did not include hexagonal boron nitride, compressed hexagonal boron nitride, or wurtzite boron nitride, cutting resistance increased, the tool was more easily damaged, and as a result, the surface roughness of the machined surface of the work material was worse.

In Example 4, the relationship among the production conditions of the above-described method (1) for manufacturing a polycrystalline cubic boron nitride, the structure (composition, total content of alkali metal and alkaline earth metal, median diameter of crystal grains, and dislocation density) of the obtained polycrystalline cubic boron nitride, and tool life when performing precision machining with a tool using the polycrystalline cubic boron nitride was investigated.

<Production of Polycrystalline Cubic Boron Nitride>

The polycrystalline cubic boron nitrides of Sample 18 to Sample 20 were manufactured according to the following procedure.

(First Step)

[Sample 18 and Sample 19]

Six grams of a hexagonal boron nitride powder (d90: 0.3 μm) was prepared. The hexagonal boron nitride powder was placed into a molybdenum capsule and arranged in an ultrahigh pressure and high temperature generator.

[Sample 20]

Six grams of a cubic boron nitride powder (d90: 3 μm) including a total of more than 10 ppm of alkali metal and alkaline earth metal was prepared. The cubic boron nitride powder was held under an argon atmosphere at a temperature of 1900° C. for 1 hour to convert the cubic boron nitride back into hexagonal boron nitride to obtain a hexagonal boron nitride powder. The hexagonal boron nitride powder was placed into a molybdenum capsule and arranged in an ultrahigh pressure and high temperature generator.

(Second Step and Third Step)

Using the above-described hexagonal boron nitride powder and ultrahigh pressure and high temperature generator, while maintaining the temperature at the temperature shown in the "temperature" column of the "starting point" in Table 4, the pressure was increased from the pressure shown in the "pressure" column to the pressure shown in the "attainment pressure" column of the "first stage", and held there for the length of time shown in the "holding time" column.

Then, while maintaining the temperature, the pressure was increased to the pressure shown in the "attainment pressure" column of the "second stage" in Table 4, and held there for the length of time shown in the "holding time" column.

Then, while maintaining the pressure, the temperature was increased to the temperature shown in the "attainment temperature" column of the "third stage" in Table 4 and held for the duration shown in the "holding time" column, whereby polycrystalline cubic boron nitride was obtained. In Sample 18 and Sample 19, the high temperature/high pressure treatment at the "attainment temperature", "attainment pressure", and "holding time" shown in the "third stage" corresponds to the third step.

<Evaluation>

(Measurement of Composition, Dislocation Density, and Median Diameter d50 of Crystal Grains)

The composition (cubic boron nitride content, hexagonal boron nitride content, and wurtzite boron nitride content), the cubic boron nitride dislocation density, and the median diameter d50 of crystal grains for the obtained polycrystalline cubic boron nitrides were measured. Since the specific measurement methods are as shown in the first embodiment, a description thereof will not be repeated here. The results are shown in the "cBN content", "hBN content", "compressed hBN content", "wBN content", "dislocation density", and "median diameter (d50)" columns of Table 4.

These cutting conditions correspond to precision machining. Further, in these conditions, the rotation speed is higher and the blade edge tends to be hotter than in cutting conditions of the cutting tests in Example 1 and Example 2.

(Tool Performance Evaluation)

The work material was cut under the cutting conditions described above, and the number of dimples having a φ10 hemispherical shape until the surface roughness Ra of the machined surface of the work material exceeded 0.2 μm was measured. A larger number of dimples indicates better wear resistance and a longer tool life. Since the specific method for measuring the surface roughness Ra of the machined surface is the same as the method described in Example 1, a description thereof will not be repeated here. The results are shown in the "number of dimples" column of Table 4.

TABLE 4

| | | | Heating and pressurizing path | | | | | | | |
|---|---|---|---|---|---|---|---|---|---|---|
| | Starting point | | First stage | | | Second stage | | | Third stage | |
| Sample No. | Temperature (° C.) | Pressure (GPa) | Attainment temperature (° C.) | Attainment pressure (GPa) | Holding time (minutes) | Attainment temperature (° C.) | Attainment pressure (GPa) | Holding time (minutes) | Attainment temperature (° C0) | Attainment pressure (GPa) |
| 18 | 25 | 0 | 25 | 11.25 | 10 | 25 | 13 | 15 | 1700 | 13 |
| 19 | 25 | 0 | 25 | 11.25 | 10 | 25 | 13 | 15 | 1700 | 13 |
| 20 | 25 | 0 | 25 | 11.25 | 10 | 25 | 13 | 15 | 1700 | 13 |

| | Heating and pressurizing path | | Polycrystaltne cubic boron nitride | | | | | | | |
|---|---|---|---|---|---|---|---|---|---|---|
| | | | | | Content of | | | | | |
| Sample No. | Third stage Holding time (minutes) | wBN Stable region entry temperature (° C.) | cBN content (% by volume) | hBN content (% by volume) | Compressed hBN content (% by volume) | wBN content (% by volume) | alkali metals/ alkaline earth metals (ppm) | Median diameter (d50) (nm) | Dislocation density (×10$^{15}$/m$^2$) | Evaluation Number of dimples (number) |
| 18 | 10 | 25 | 97.3 | 0 | 0.3 | 2.4 | 5 | 79 | 11.1 | 40 |
| 19 | 10 | 25 | 97.2 | 0 | 0.3 | 2.5 | 9 | 80 | 10.9 | 38 |
| 20 | 10 | 25 | 97.3 | 0 | 0.4 | 2.3 | 20 | 78 | 10.5 | 15 |

(Measurement of Total Content of Alkali Metal Elements and Alkaline Earth Metal Elements)

The total content of alkali metal elements and alkaline earth metal elements in the obtained polycrystalline cubic boron nitrides was measured by SIMS. Since the specific measurement method is as described in the first embodiment, a description thereof will not be repeated here. The total content of alkali metal elements and alkaline earth metal elements is shown in the "alkali metal/alkaline earth metal content" column of Table 4.

(Cutting Test)

The obtained polycrystalline cubic boron nitrides were cut with a laser and finished to produce a ball end mill. Using this ball end mill, spherical machining of STAVAX ESR® (stainless tool steel manufactured by Uddeholm) was performed under the following cutting conditions to evaluate tool performance.

(Cutting Conditions)
Work material: STAVAX ESR® (stainless tool steel manufactured by Uddeholm)
Tool shape: Ball end mill, R 0.5 mm per blade
Rotation speed: 60000 rpm
Feed: 1000 mm/min
Depth of cut (ap): 0.005 mm
Cutting width (ae): 0.005 mm
With oil mist
Machined into a φ10 hemispherical shape <Consideration>

[Sample 18 and Sample 19]

The production method of each of Sample 18 and Sample 19 corresponded to the Example. The polycrystalline cubic boron nitrides of Sample 18 and Sample 19 all included 96% by volume or more of cubic boron nitride, had a cubic boron nitride dislocation density of more than $8\times10^{15}$/m$^2$, and had a median diameter d50 of the crystal grains of less than 100 nm, and hence corresponded to the Example. It was confirmed that a tool using the polycrystalline cubic boron nitrides of Sample 18 and Sample 19 had a large number of dimples, and even in precision machining under conditions in which the blade edge tends to become hot, the tool was not susceptible to damage and had a long tool life.

[Sample 20]

The polycrystalline cubic boron nitride of Sample 20 included 96% by volume or more of cubic boron nitride, had a cubic boron nitride dislocation density of more than $8\times10^{15}$/m$^2$, and had a median diameter d50 of the crystal grains of less than 100 nm, and hence corresponded to the Example. It was confirmed that a tool using the polycrystalline cubic boron nitride of Sample 20 had 15 or more dimples, and even in precision machining under conditions in which the blade edge tends to become hot, tool life was good.

When comparing Sample 18 to Sample 20, Sample 18 and Sample 19 had a longer tool life than Sample 20. It is thought that this is because in the polycrystalline cubic boron nitride of Sample 18 and Sample 19, the total content of alkali metal elements and alkaline earth metal elements was 10 ppm or less, so that even in precision machining under conditions in which the blade edge tends to become hot, conversion from hexagonal boron nitride into cubic boron nitride due to alkali metal elements and alkaline earth metal elements is less likely to occur, and damage to the tool can be better prevented from progressing.

Sample 18 and Sample 19 differed in terms of their composition, total content of alkali metal elements and alkaline earth metal elements, median diameter d50 of the crystal grains, and dislocation density of the cubic boron nitride. It is thought that this is due to variations in, for example, the amount of impurities and the particle size of the raw material hexagonal boron nitride.

Although embodiments and Examples of the present disclosure have been described above, from the beginning it has been planned that various configurations of the above-described embodiments and Examples may be appropriately combined and variously modified.

The embodiments and Examples disclosed this time are to be considered as illustrative in all points and are not restrictive. The scope of the present disclosure is shown not by the embodiments and examples described above but by the claims, and it is intended meanings equivalent to the claims and all modifications are also included within the scope of the present disclosure.

The invention claimed is:

1. A polycrystalline cubic boron nitride comprising 96% by volume or more of cubic boron nitride, wherein
the cubic boron nitride has a dislocation density of more than $8 \times 10^{15}/m^2$,
the polycrystalline cubic boron nitride comprises a plurality of crystal grains, and
the plurality of crystal grains have a median diameter d50 of an equivalent circle diameter of less than 100 nm.

2. The polycrystalline cubic boron nitride according to claim 1, wherein the dislocation density is $9 \times 10^{15}/m^2$ or more.

3. The polycrystalline cubic boron nitride according to claim 1, wherein the polycrystalline cubic boron nitride comprises 0.01% by volume or more of hexagonal boron nitride.

4. The polycrystalline cubic boron nitride according to claim 1, wherein the polycrystalline cubic boron nitride comprises 0.01% by volume or more of compressed hexagonal boron nitride.

5. The polycrystalline cubic boron nitride according to claim 1, wherein the polycrystalline cubic boron nitride comprises 0.1% by volume or more of wurtzite boron nitride.

6. The polycrystalline cubic boron nitride according to claim 1, wherein the polycrystalline cubic boron nitride comprises a total content of an alkali metal element and an alkaline earth metal element of 10 ppm or less in terms of mass.

7. The polycrystalline cubic boron nitride according to claim 1, wherein the dislocation density is calculated by using a modified Williamson-Hall method and a modified Warren-Averbach method.

8. The polycrystalline cubic boron nitride according to claim 1, wherein the dislocation density is measured using synchrotron radiation as an X-ray source.

9. A method for manufacturing the polycrystalline cubic boron nitride according to claim 1, comprising:

a first step of preparing a hexagonal boron nitride powder having a d90 of an equivalent circle diameter of 0.3 μm or less; and a second step of heating and pressurizing the hexagonal boron nitride powder to a temperature greater than or equal to 1500° C. and less than or equal to 2200° C. and to a pressure greater than or equal to 10 GPa, with the temperature and the pressure passing through a temperature and a pressure in a stable region of a wurtzite boron nitride, to obtain the polycrystalline cubic boron nitride, in the heating and pressurizing path of the second step, an entry temperature into the stable region of wurtzite boron nitride is 500° C. or less, and the second step comprises a step of holding the temperature and the pressure in the heating and pressurizing path for 10 minutes or more at a temperature and a pressure in the stable region of wurtzite boron nitride, wherein the stable region of wurtzite boron nitride is, when the temperature is represented as T° C. and the pressure as P GPa, a region that simultaneously satisfies the following Formula 1 and Formula 2, $$P \geq -0.0037T + 11.301 \qquad \text{Formula 1:}$$

$$P \leq -0.085T + 117 \qquad \text{Formula 2.}$$

10. The method for manufacturing the polycrystalline cubic boron nitride according to claim 9, wherein the entry temperature is 300° C. or less.

11. The method for manufacturing the polycrystalline cubic boron nitride according to claim 9, wherein the second step comprises a step of holding the temperature and the pressure in the heating and pressurizing path for 15 minutes or more at a temperature and a pressure in the stable region of wurtzite boron nitride.

12. The method for manufacturing the polycrystalline cubic boron nitride according to claim 9, wherein the second step comprises a step of, when the temperature is represented as T° C. and the pressure as P GPa, holding the temperature and the pressure in the heating and pressurizing path for 10 minutes or more at a temperature and a pressure in a region that simultaneously satisfies the following Formula 1, Formula 2, and Formula 3, $$P \geq -0.0037T + 11.301 \qquad \text{Formula 1:}$$

$$P \leq -0.085T + 117 \qquad \text{Formula 2:}$$

$$P \leq -0.0037T + 11.375 \qquad \text{Formula 3.}$$

13. The method for manufacturing the polycrystalline cubic boron nitride according to claim 9, further comprising a third step of, after the second step, holding the polycrystalline cubic boron nitride obtained in the second step for 10 minutes or more and 30 minutes or less under conditions of a temperature of 1500° C. or more and 2200° C. or less and a pressure of 10 GPa or more.

14. A method for manufacturing the polycrystalline cubic boron nitride according to claim 1, comprising:

a step A of preparing pyrolytic boron nitride; and a step B of heating and pressurizing the pyrolytic boron nitride to a temperature and a pressure in a final sintering region, with the temperature and the pressure passing through a temperature and a pressure in a stable region of a wurtzite boron nitride, to obtain the polycrystalline cubic boron nitride, and in the heating and pressurizing path of step B, an entry temperature into the stable region of wurtzite boron nitride is 500° C. or less, wherein the stable region of wurtzite boron nitride is, when the temperature is represented as T° C. and the pressure as P GPa, a region that simultaneously satisfies the following Formula 1 and Formula 2, $P \geq -0.0037T+11.301$ Formula 1:

$P \leq -0.085T+117$ Formula 2:

the final sintering region is, when the temperature is represented as T° C. and the pressure as P GPa, a region that simultaneously satisfies the following Formula 4, Formula 5, and Formula 6, $P \geq 12$ Formula 4:

$P \geq -0.085T+125.5$ Formula 5:

$P \leq -0.085T+151$ Formula 6.

15. The method for manufacturing the polycrystalline cubic boron nitride according to claim 14, wherein the entry temperature is 300° C. or less.

16. The method for manufacturing the polycrystalline cubic boron nitride according to claim 14, further comprising a step C of, after step B, holding the polycrystalline cubic boron nitride obtained in step B for 10 minutes or more and 30 minutes or less under conditions of a temperature and a pressure in the final sintering region.

* * * * *